(12) United States Patent
Cordero et al.

(10) Patent No.: US 11,871,707 B2
(45) Date of Patent: Jan. 16, 2024

(54) FUNGAL-BASED AIR COOLING SYSTEM

(71) Applicant: THE JOHNS HOPKINS UNIVERSITY, Baltimore, MD (US)

(72) Inventors: Radames J B Cordero, Baltimore, MD (US); Arturo Casadevall, Baltimore, MD (US)

(73) Assignee: The Johns Hopkins University, Baltimore, MD (US)

(*) Notice: Subject to any disclaimer, the term of this patent is extended or adjusted under 35 U.S.C. 154(b) by 0 days.

(21) Appl. No.: 17/734,868

(22) Filed: May 2, 2022

(65) Prior Publication Data

US 2022/0354069 A1 Nov. 10, 2022

Related U.S. Application Data

(60) Provisional application No. 63/182,485, filed on Apr. 30, 2021.

(51) Int. Cl.
*A01G 18/69* (2018.01)
*A01G 18/64* (2018.01)

(52) U.S. Cl.
CPC ............ *A01G 18/69* (2018.02); *A01G 18/64* (2018.02)

(58) Field of Classification Search
CPC .................................. A01G 18/64; A01G 18/69
See application file for complete search history.

(56) References Cited

U.S. PATENT DOCUMENTS

| | | | |
|---|---|---|---|
| 5,333,751 A * | 8/1994 | Santucci, Sr. | B65D 25/108 229/120.32 |
| D387,145 S | 12/1997 | Knight | |
| 6,112,538 A | 9/2000 | Strussion | |
| 6,748,696 B1 * | 6/2004 | Davidson | A01G 18/62 435/283.1 |
| 7,448,224 B2 | 11/2008 | Wu | |
| 7,694,942 B1 | 4/2010 | Genera | |
| 8,112,181 B2 | 2/2012 | Remsburg | |
| D857,425 S * | 8/2019 | Crutcher | D6/661 |
| D858,148 S * | 9/2019 | Crutcher | D6/661 |
| D861,384 S * | 10/2019 | Crutcher | D6/661 |
| D977,319 S * | 2/2023 | Chen | D8/1 |
| 2014/0208642 A1 * | 7/2014 | Henman | A01G 9/00 47/19.2 |

(Continued)

FOREIGN PATENT DOCUMENTS

| | | | | |
|---|---|---|---|---|
| WO | 2005120210 A1 | 12/2005 | | |
| WO | WO-2017125588 A1 * | 7/2017 | ............. | A01G 18/64 |
| WO | WO-2019226046 A1 * | 11/2019 | ............. | A01G 18/62 |

OTHER PUBLICATIONS

Dittmeyer et al, "Crowd oil not crude oil." Nature Communications, 2019, 1-8, 10, No. 1.

(Continued)

*Primary Examiner* — Monica L Perry
*Assistant Examiner* — Aaron M Rodziwicz

(57) ABSTRACT

A cooling device according to the present invention includes a housing configured to accommodate fungi. Warm air enters the housing through an inlet located in the housing. The air flows through the housing, which holds fungi. The air exits the housing and can be driven by an exhaust fan. In some embodiments, a HEPA filter is included to purify the air and prevent dispersal of fungal spores.

20 Claims, 16 Drawing Sheets

(56) References Cited

U.S. PATENT DOCUMENTS

| | | | |
|---|---|---|---|
| 2016/0073589 A1* | 3/2016 | McNamara | A01G 18/20 47/1.1 |
| 2022/0279737 A1* | 9/2022 | Enders | A01G 18/64 |
| 2022/0400628 A1* | 12/2022 | Reimnitz | G08C 17/02 |

OTHER PUBLICATIONS

Husher, et al , "Evaporative cooling of mushrooms." Mycologia , 1999, 351-352, 91, No. 2.

McDonald et al. "Vacuum cooling technology for the food processing industry: a review." Journal of food engineering 2000, 55-65, 45, No. 2.

Dressaire et al. "Mushrooms use convectively created airflows to disperse their spores." Proceedings of the National Academy of Sciences ,2016, 2833-2838, 113, No. 11.

Lineweaver et al., "Life, gravity and the second law of thermodynamics." Physics of Life Reviews 2008, 225-242, 5, No. 4.

Bar-On et al., "The biomass distribution on Earth." Proceedings of the National Academy of Sciences , 2018, 6506-6511, 115, No. 25.

Mahan et al., "Maintenance of constant leaf temperature by plants-I. Hypothesis-limited homeothermy." Environmental and Experimental Botany , 1988, 351-357, 28, No. 4.

Doughty et al., "Seasonal patterns of tropical forest leaf area index and CO2 exchange." Journal of Geophysical Research: Biogeosciences ,2008, 113, No. G1.

Fischer et al., "Why mushrooms form gills: efficiency of the lamellate morphology." Fungal Biology , 2010, 57-63, 114, No. 1.

Mahajan et al., "Effect of temperature and humidity on the transpiration rate of the whole mushrooms." Journal of Food Engineering , 2008, 281-288, 84, No. 2.

Cordero et al., "Impact of yeast pigmentation on heat capture and latitudinal distribution." Current Biology , 2018, 2657-2664 ,28, No. 16.

Krah et al. "European mushroom assemblages are darker in cold climates." Nature communications , 2019, 1-11, 10, No. 1.

Pinkert et al., "Thermal biology: melanin-based energy harvesting across the tree of life." Current Biology, 2018, R887-R889, 28, No. 16.

Tabata et al., "Measurement of soil bacterial colony temperatures and isolation of a high heat-producing bacterium." BMC microbiology , 2013, -7, 13, No. 1,1.

Utsumi et al. "Acetic acid treatment enhances drought avoidance in cassava (Manihot esculenta Crantz)." Frontiers in Plant Science 2019, 10, 521.

Vaz et al "Chemical composition of wild edible mushrooms and antioxidant properties of their water soluble polysaccharidic and ethanolic fractions." Food Chemistry ,2011,610-616, 126, No. 2.

Maxson et al. "The volume and hydration of the Cryptococcus neoformans polysaccharide capsule." Fungal Genetics and Biology ,2007,180-186, 44, No. 3.

Wilkinson et al , "The extracellualr polysaccharides of bacteria" , Bacteriol Rev , 1958,46-73, 22(1).

Turner et al, "Mass and momentum transfer on the small scale: How do mushrooms shed their spores?. " Chemical engineering science , 1991, 1145-1149, 46, No. 4.

Hansen et al, "Global surface temperature change." Reviews of Geophysics , 2010, 48, No. 4.

\* cited by examiner

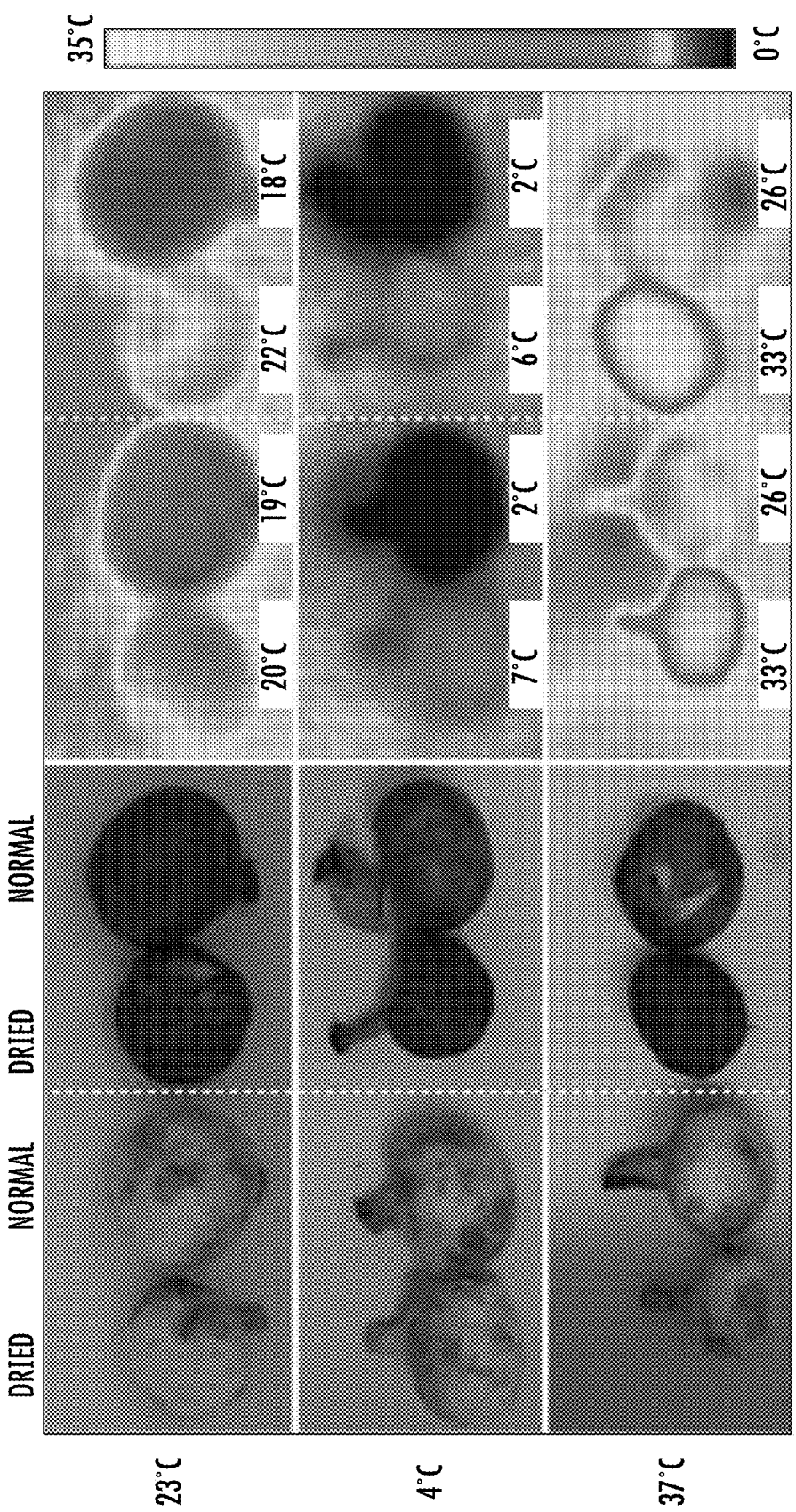

FUNGAL-BASED AIR COOLING SYSTEM

CROSS REFERENCE TO RELATED APPLICATIONS

This application claims the benefit of U.S. Provisional Patent Application No. 63/182,485 filed on Apr. 30, 2021, which is incorporated by reference, herein, in its entirety.

FIELD OF THE INVENTION

The present invention relates generally to cooling devices. More particularly, the present invention relates to fungal-based air cooling systems.

BACKGROUND OF THE INVENTION

Temperature controls the growth, reproduction, and dispersal of all life forms. The temperature of an organism depends on the balance between gaining and dissipating heat as it is influenced by its total environment (i.e., physical-chemical, biotic-abiotic, micro-macro dimensions). In theory, if the organism gains more thermal energy than it dissipates, it becomes warmer. If more thermal energy is lost, the organism may reach colder temperatures than its surroundings. When the organism and the environment each have the same temperature, there is no heat flow; hence the organism is in thermal equilibrium. Living organisms are considered dissipative systems that exist far from thermodynamic equilibrium; that could mean warmer or colder, but not equal to the surroundings.

Organisms can be classified based on their capacity to maintain their body temperatures relative to their environment. Endothermic organisms (alias 'warm-blooded'), like birds and mammals, can maintain relatively constant internal temperatures that range from 36 to 40° C., regardless of any fluctuations in outside temperature. Most life forms are, however, ectothermic (alias 'cold-blooded') because their internal temperatures fluctuate based on external temperatures. Much of the energy driving ectotherm metabolism comes from their surroundings, capturing heat from radiation energy via pigments like melanin. Plants makeup ~80% of Earth biomass and may be considered the "epitome of poikilothermy" because these are frequently found in environments that are subject to wide variations in temperature and, contrary to reptiles or fish, cannot displace to more favorable thermal environments when needed. To prevent overheating, plants and animals, give off heat via the evaporation of water at their surfaces in a process known as evaporative cooling, transpiration, or evapotranspiration. The evaporation of water is an endothermic process that consumes thermal energy to break hydrogen bonds when water goes from liquid to a gas. Cellular structures like animal sweat glands and plant stomas regulate the water transpiration process. Depending on the thermal environmental conditions, leaves can dissipate heat via evaporative cooling and become colder than air temperature. Fungal, protist, archaeal, and bacterial communities are assumed to be ectothermic considering their relatively simpler physiology and small size or high surface area-volume ratio, however, the temperature of microbial communities and the mechanisms of heat exchange with their surroundings are unknown.

In geologic history, the fungi pioneered the colonization of land and today play a central role in balancing Earth's ecology by breaking down decaying biological matter and providing nutrients for new growth. Fungal organisms can survive almost anywhere and are a source of food, medicines, and a variety of biomaterials. Fungi come in the forms of microscopic to macroscopic mushroom-producing mycelium, yeasts, and molds communities. The fungal kingdom also includes species that are pathogenic to animal and plant flora, causing severe public health and agricultural problems. Mushrooms, the reproductive structure of fungal mycelium, are usually formed by a stem or stalk and a cap or pileus. Pilei are often convex but can also form other shapes during development and between species. The area underneath the pilei, the hymenium, consists of lamellae gills or porous surfaces bearing spores. The lamellar constitution of the hymenium can increase the surface area of mushrooms by 20 folds. The structural organization of the hymenium is important for spore production and spore release.

Mushroom pilei were noted to be cold relative to their surroundings. The first study inserted thermocouple detectors into mushrooms and suggested that the relatively cold temperatures were mediated by evaporative cooling. Quantitative data of mushroom transpiration was provided in subsequent studies. The transpiration rate of *A. bisporous* whole mushrooms has been studied and there are mathematical models to link mushroom water loss with ambient temperature and relative humidity. Subsequently, the rate of water loss from mushroom pilei has also been quantified, which can be higher than plants and enough to cool the surrounding air by several degrees Celsius.

Therefore, it would be advantageous to provide a device and method for a fungal-based cooling system.

SUMMARY OF THE INVENTION

The foregoing needs are met, to a great extent, by the present invention, wherein in one aspect a device for a device for cooling including a housing defining an inlet and an outlet. The device includes a cassette configured to be positioned within the housing. The cassette is also configured for growth of a living organism. The device includes a fungal specimen positioned on the cassette. A path is configured to direct flow of a fluid through the housing from the inlet to the outlet.

In accordance with an aspect of the present invention, an exhaust fan to drive the flow of the fluid out of the housing. The device includes a filter to filter fungal spores out of the fluid. The device includes a temperature probe and a humidity probe. The fungal specimen can take the form of a mushroom. The inlet is positioned near a bottom portion of the housing, and the outlet is positioned near a top portion of the housing. The device can include an energy source. The energy source further can take the form of a photovoltaic cell or a solar cell. The housing can take the form of an insulating box. The insulating box can be a Styrofoam box. The housing can define a shelf on which the cassette can be positioned.

In accordance with another aspect of the present invention, a kit includes a housing defining an inlet and an outlet. The kit includes a cassette configured to be positioned within the housing, wherein the cassette is also configured for growth of a living organism. The kit also includes a fungal specimen configured to be positioned on the cassette.

In accordance with yet another aspect of the present invention, the kit includes a fan for air circulation. The kit can include a power source. The kit can include a temperature probe and/or a humidity probe. The kit can also include shelving on which the cassette can be disposed within the housing.

BRIEF DESCRIPTION OF THE DRAWINGS

The accompanying drawings provide visual representations, which will be used to more fully describe the representative embodiments disclosed herein and can be used by those skilled in the art to better understand them and their inherent advantages. In these drawings, like reference numerals identify corresponding elements and:

FIGS. 2A-2D illustrate image and heat map views of fungi.

FIG. 8A illustrates *Amanita* spp., FIG. 8B illustrates *Pleurotus ostreatus*, FIG. 8C illustrates *Pycnoporus* spp., FIG. 8D illustrates *Amanita muscaria*, FIG. 8E illustrates *Amanita brunnescens*, FIG. 8F illustrates *Russula* spp. FIG. 8G illustrates yeast *Candida* spp. (also seen in FIG. 8B as white colonies), FIG. 8H illustrates mold *Cladosporium sphaerospermum* (dark colony), FIG. 8I illustrates mold *Penicillium* spp., and FIG. 8J illustrates yeast *Rhodotorula mucilaginosa*. FIG. 8K illustrates the temperature difference between the surrounding/ambient and fungal specimen.

DETAILED DESCRIPTION

Figure 1B:
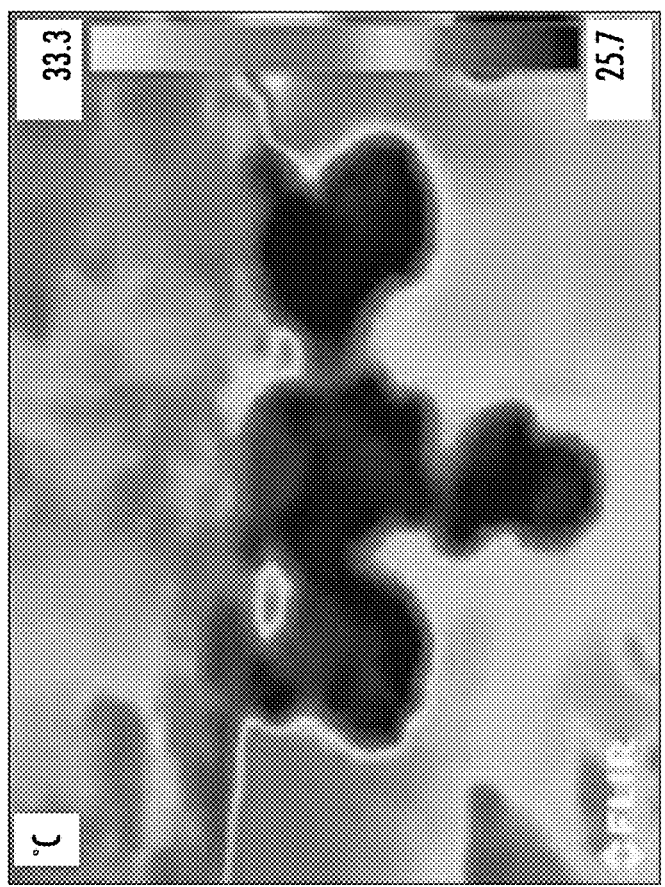
FIGS. 1A and 1B illustrate image and heat map views of fungi.

The presently disclosed subject matter now will be described more fully hereinafter with reference to the accompanying Drawings, in which some, but not all embodiments of the inventions are shown. Like numbers refer to like elements throughout. The presently disclosed subject matter may be embodied in many different forms and should not be construed as limited to the embodiments set forth herein; rather, these embodiments are provided so that this disclosure will satisfy applicable legal requirements. Indeed, many modifications and other embodiments of the presently disclosed subject matter set forth herein will come to mind to one skilled in the art to which the presently disclosed subject matter pertains having the benefit of the teachings presented in the foregoing descriptions and the associated Drawings. Therefore, it is to be understood that the presently disclosed subject matter is not to be limited to the specific embodiments disclosed and that modifications and other embodiments are intended to be included within the scope of the appended claims.

A cooling device according to the present invention includes a housing configured to accommodate fungi. Warm air enters the housing through an inlet located in the housing. The air flows through the housing, which holds fungi. The air exits the housing and can be driven by an exhaust fan. In some embodiments, a HEPA filter is included to purify the air and prevent dispersal of fungal spores.

Fungi play essential roles in global ecology and economy, but the thermal biology of fungi is widely unknown. Infrared imaging reveals that mushrooms, yeasts, and molds each maintained colder temperatures than their surroundings. Fungal specimens are to be ~2.5° C. colder than the surrounding temperature. Time-lapse infrared images of *Pleurotus ostreatus* revealed hypothermia throughout mushroom growth and after detachment from mycelium. The hymenium was coldest, and different areas of the mushroom exhibit distinct thermal changes during heating and cooling. The fruiting area in the mycelium remained relatively cold following mushroom detachment. Analyses of *Agaricus bisporus* mushroom pilei confirmed that the mechanism for mushroom hypothermia depends on evaporative cooling. Evaporative cooling is also evident in biofilms of *Cryptococcus neoformans*, and *Penicillium* spp. molds based on the accumulation of condensed water droplets on the lids over biofilms grown on agar media plates. Biofilms of *C. neoformans* acapsular mutant showed more transpiration and were colder than wildtype. *Penicillium* biofilms appear to transpire ten times more than the supporting agar.

The present invention harnesses the evaporative cooling capacity of mushrooms to construct a mushroom based air-cooling system capable of passively reducing the temperature of a closed compartment by approximately 10° C. in 25 minutes. Because hypothermia is a characteristic of the fungal kingdom, and fungi make up ~2% of Earth biomass, their ability to dissipate heat may contribute significantly to planetary temperatures in local environments. These findings are relevant to the current global warming crisis and suggest that large-scale myco-cultures and myco-culture based cooling devices, such as that of the present invention could help mitigate increasing planetary temperature. Further, fungi exhibit a common mechanism that involves cooling from the evaporation of fungal-associated water.

The present invention solves the problem of cooling the air with minimal energy demand and carbon emission. Indeed, alternative power sources such as solar can be used to power any electric components of the device. As the Earth continues to warm up and human population continues to increase, there needs to be more cooling with half the emissions. Air conditioning systems are used by almost everyone, every day. This is a ground-breaking improvement to current air cooling technologies. It is unique because it exploits the newly-discovered hypothermic physiology of mushrooms to cool the air with minimal energy demand and carbon emissions. End-users of this technology covers domestic and commercial buildings.

Figure 1A:

FIGS. 1A and 1B illustrate image and heat map views of fungi. FIGS. 2A-2D also illustrate image and heat map views of fungi. As illustrated in FIGS. 1A and 1B, thermal imaging of wild-type *Pleurotus ostreatus* reveals its hypothermic nature. Mushrooms are mainly (>90% w/w) composed of water and their morphology (high surface area) makes them effective at maintaining cool temperatures via evaporative cooling. FIG. 1B shows that the mushrooms on the log of FIG. 1A, are cooler than their surroundings. FIGS. 2C and 2D illustrate that the mushrooms of FIGS. 2A and 2B are also cooler than their surroundings. iMushroom evaporative cooling as a function of ambient temperature. White and Black *Agaricus bisporus* mushrooms were dehydrated to remove ~94% (w/w) water content. Dehydrated and normal mushroom caps were incubated at 4, 23, and 37° C. ambient temperatures. Normal mushrooms are able to maintain cooler temperatures regardless of the ambient temperature.

Figure 3:
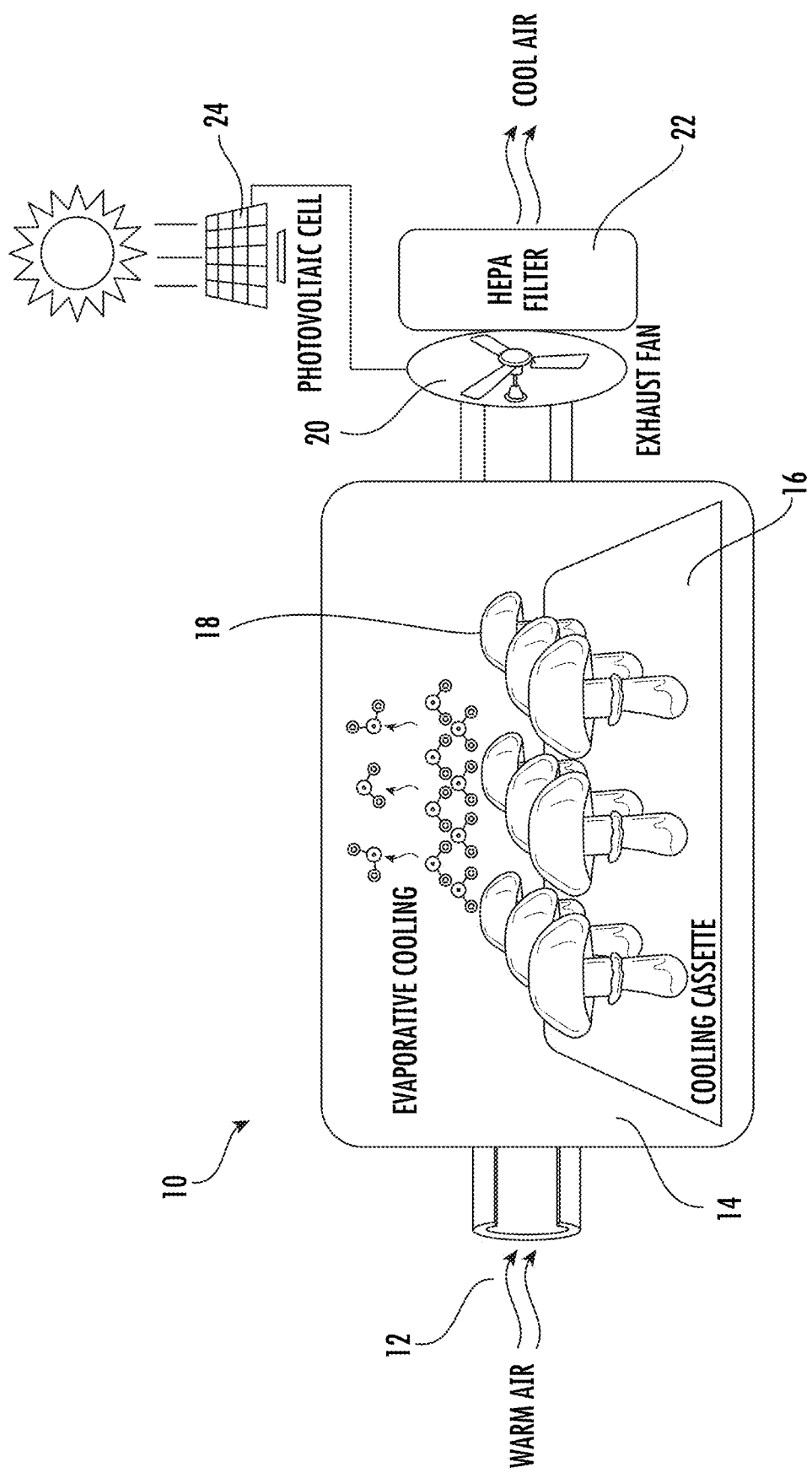
FIG. 3 illustrates a schematic diagram of a device for cooling according to an embodiment of the present invention.

FIG. 3 illustrates a schematic diagram of a device for cooling according to an embodiment of the present invention. As illustrated, FIG. 3 is a prototype model for air conditioning device 10 with zero carbon-emissions. Warm air 12 enter a chamber 14 defined by housing 15 containing replaceable cassettes 16 pre-conditioned for growth of mushrooms 18. As the warm air 12 flows inside the chamber 14, mushroom-assisted evaporative cooling will cool the warm air 12. An exhaust fan 20 will push the cooled air through an HEPA filter 22 to limit spore dispersal. The exhaust fan 20 can be powered via a photovoltaic cell 24 making this air conditioning device 10 free of carbon emissions.

Figure 4:
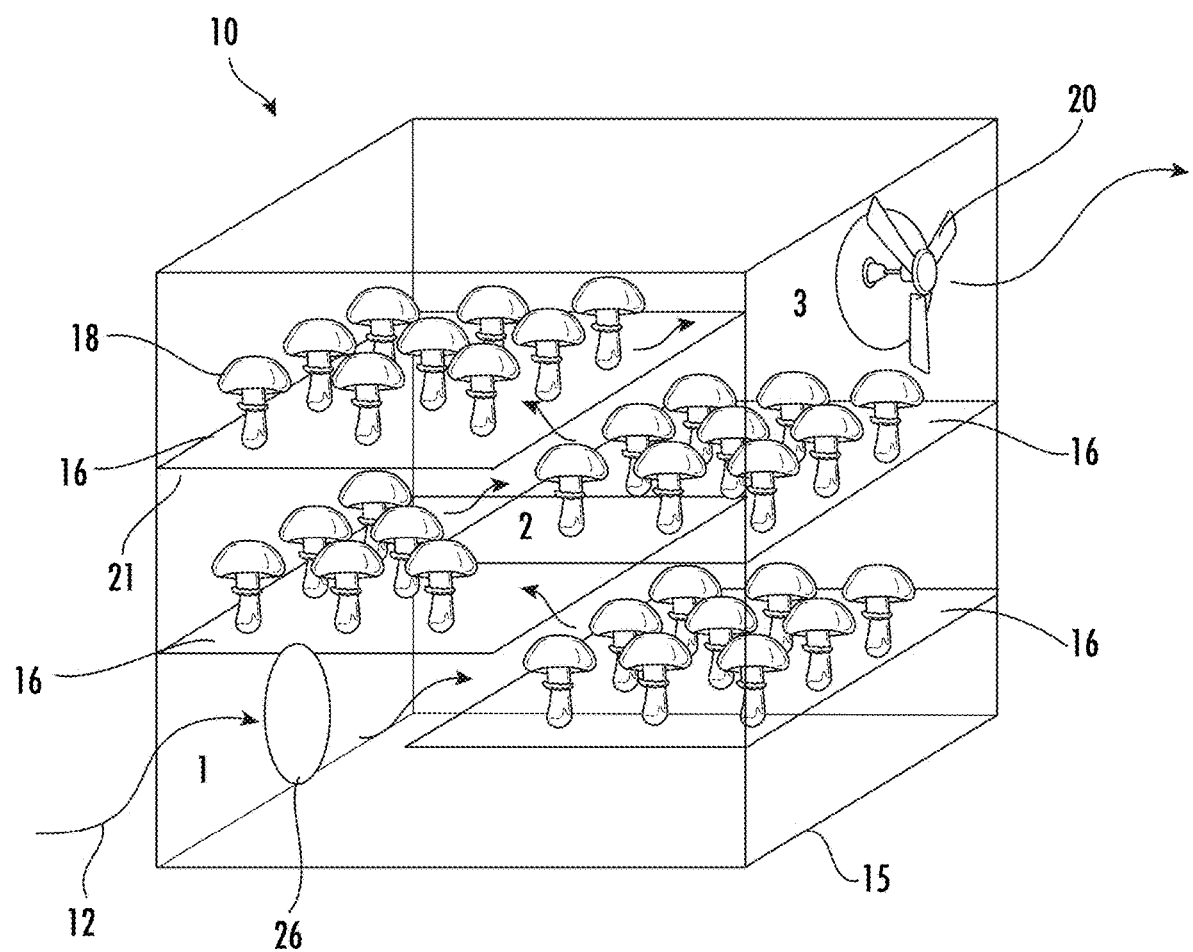
FIG. 4 illustrates a schematic diagram of a device for cooling according to an embodiment of the present invention.

FIG. 4 illustrates a schematic diagram of a device for cooling according to an embodiment of the present invention. Warm and dried air 12 enters the device 10 via an inlet 26 located near a bottom portion of a housing 15 of the device 10. The warm air 12 travels through a series of cassettes 16 pre-conditioned for growth of mushrooms 18. As the warm air 12 flows through the chamber and passes over the mushrooms 18 on the cassettes 16, it is cooled by the mushrooms 18, which are cooler than their surrounding environment. The air exits the device through outlet 30 positioned in an upper region of the device. Exhaust fan 20 pushes the air out of the device 10. The cassettes 16 can be positioned on shelves 21 within the device 10. The shelves 21 allow the cassettes to be dispersed throughout the device 10.

Figure 5:
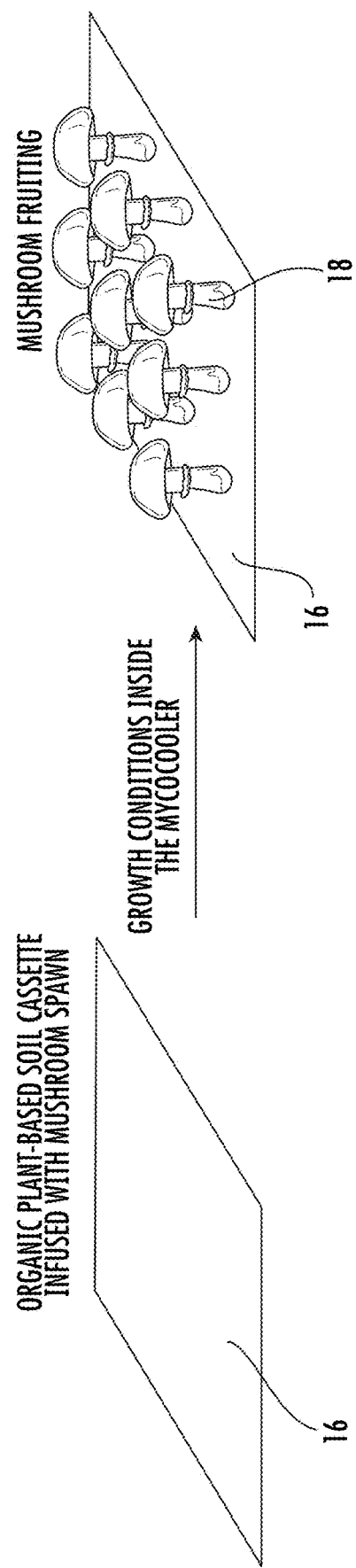
FIG. 5 illustrates a schematic diagram of a cassette for a cooling device, according to an embodiment of the present invention.

FIG. 5 illustrates a schematic diagram of a cassette for a cooling device, according to an embodiment of the present invention. Cassettes 16 can be formed from organic plant-based soil and infused with mushroom spawn 18. The cassettes 16 are configured to be placed within the device. The growth conditions within the device allow for mushroom fruiting within the device. Air flow from the bottom of the device to the top allows the air to interact with mushrooms fruiting from cassettes made of organic plant-based soil infused with mushroom spawn (similar products are already available in the market (i.e., backtotheroots.com). The air is thus cooled by passing through the cassettes with mushroom fruiting.

Figure 6:
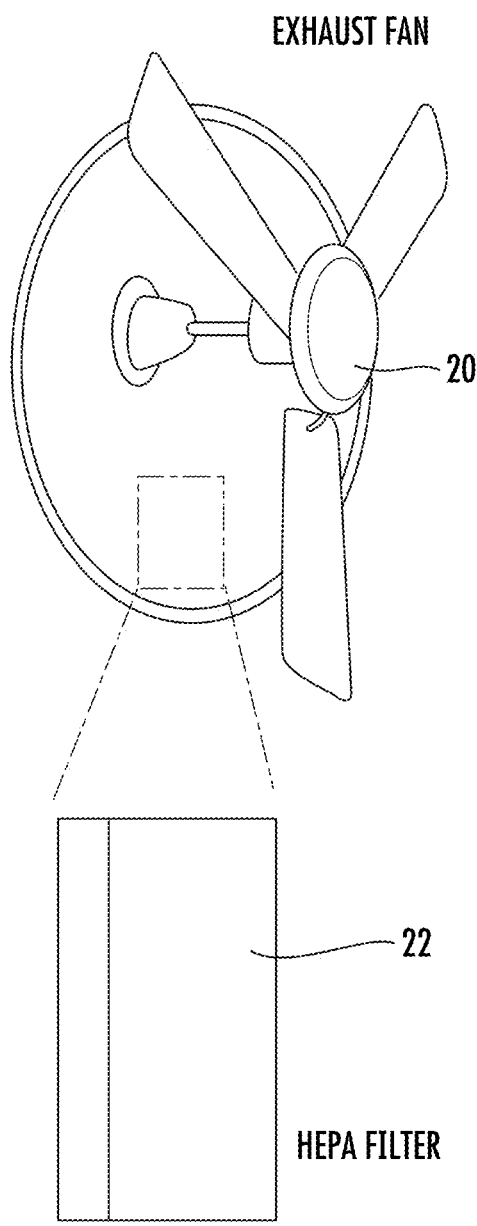
FIG. 6 illustrates a schematic diagram of a fan and filter for a cooling device, according to an embodiment of the present invention.

FIG. 6 illustrates a schematic diagram of a fan and filter for a cooling device, according to an embodiment of the present invention. As illustrated in FIG. 6, the exhaust fan 20 is configured to push air out of the device. In a preferred embodiment, the exhaust fan 20 pushes air out of the device and through a HEPA filter 22. The travel of the air through the device both cools and humidifies the air. The cooled and humidified air leaves the device via the outlet located at the upper portion of the device. The air flow is driven by an exhaust fan and is filtered through an HEPA filter before leaving the device in order to prevent spore dispersal.

Figure 7A:
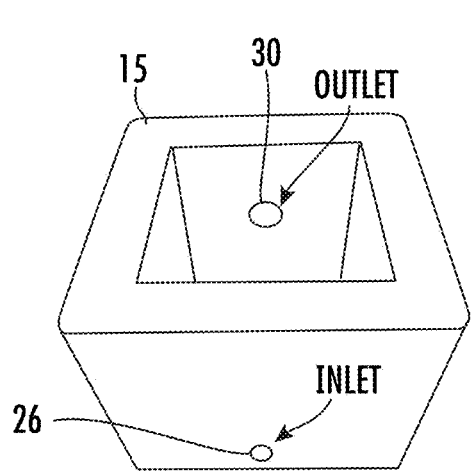
FIGS. 7A-7C illustrate perspective views of a housing for a cooling device, according to an embodiment of the present invention.
Figure 7B:
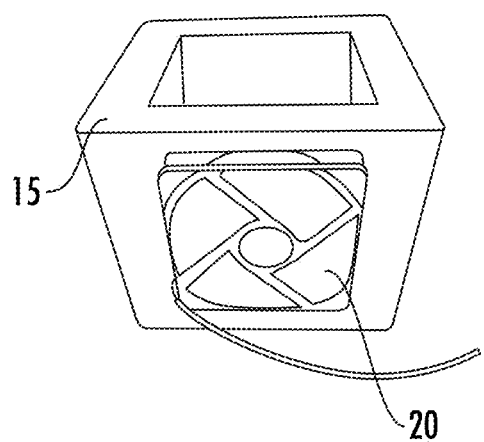
Figure 7C:
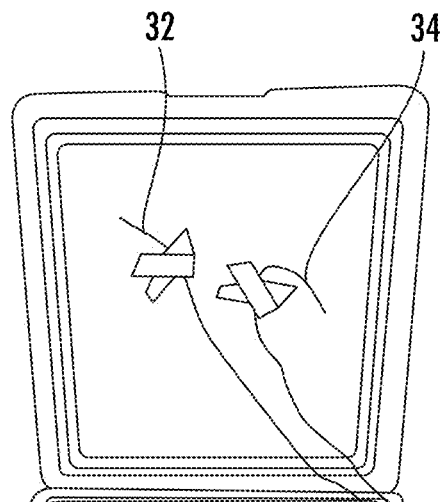

FIGS. 7A-7C illustrate perspective views of a housing for a cooling device, according to an embodiment of the present invention. FIG. 7A shows a housing 15. As shown in FIG. 7A, by way of example, the housing takes the form of a large styrofoam box ((30.48×30.48×30.48 cm) having an area of 28,317 cm$^3$. FIG. 7B illustrates another embodiment of the housing made of a smaller Styrofoam box (lid not shown) with an inlet aperture 26 of 1 cm diameter and outlet aperture 30 of 2 cm diameter. An exhaust fan 20 is connected outside the box centered on top of the outlet aperture 30. Temperature and humidity probes 32, 34 taped to the inner side of the lid can be observed in FIG. 7C. The Styrofoam box is used as an example and any insulative box can be used in conjunction with the present invention.

Figures 8A, 8B, 8C, 8D, 8E, 8F:
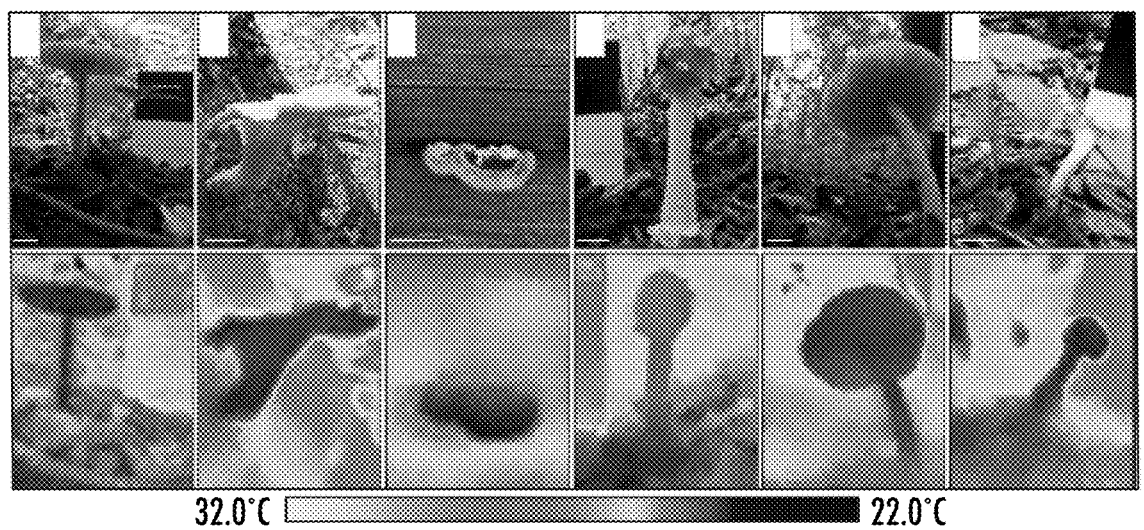
FIGS. 8A-8K illustrate images and thermographic images of yeasts, molds, and mushrooms imaged in their natural habitat.
Figures 8G, 8H, 8I, 8J:
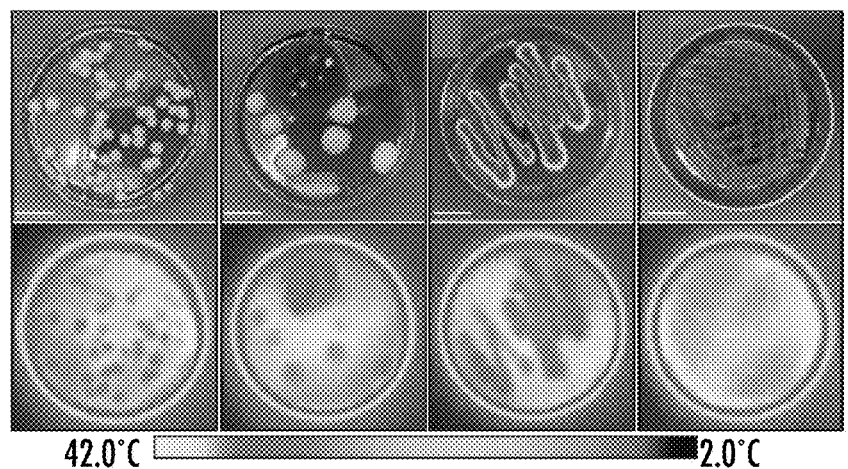
Figure 8K:
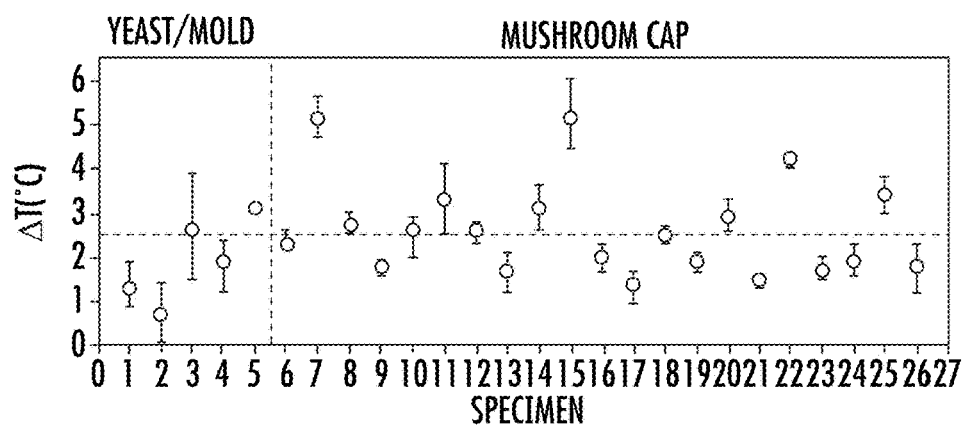

FIGS. 8A-8K illustrate images and thermographic images of yeasts, molds, and mushrooms imaged in their natural habitat: FIG. 8A illustrates *Amanita* spp., FIG. 8B illustrates *Pleurotus ostreatus*, FIG. 8C illustrates *Pycnoporus* spp., FIG. 8D illustrates *Amanita muscaria*, FIG. 8E illustrates *Amanita brunnescens*, FIG. 8F illustrates *Russula* spp. FIG. 8G illustrates yeast *Candida* spp. (also seen in FIG. 8B as white colonies), FIG. 8H illustrates mold *Cladosporium sphaerospermum* (dark colony), FIG. 8I illustrates mold *Penicillium* spp., and FIG. 8J illustrates yeast *Rhodotorula mucilaginosa*. FIG. 8K illustrates the temperature difference between the surrounding/ambient and fungal specimen. Error bars represent standard deviation. The temperature values of all fungal specimens and surroundings are listed in Table 1.

Figure 12:
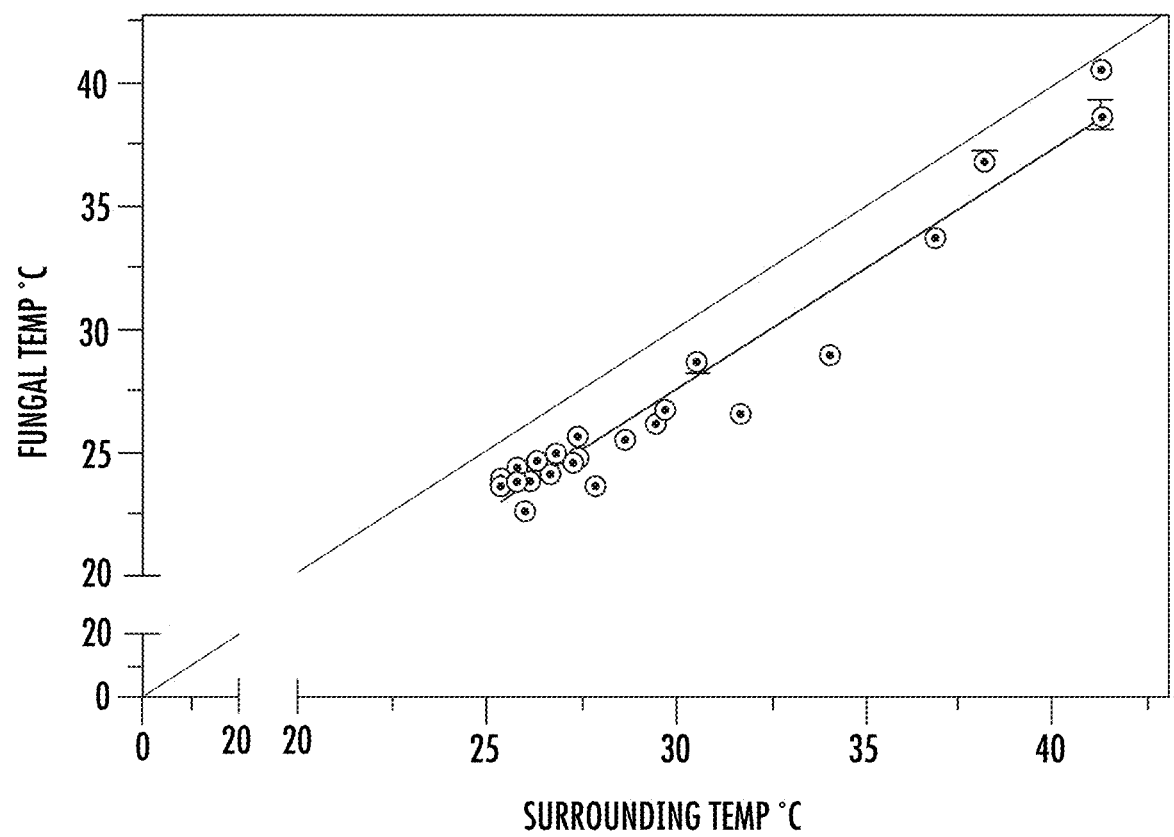
FIG. 12 illustrates a graphical view of fungal temperature as a function of surrounding temperature.

Mushrooms, yeasts, and molds maintain colder temperatures than their surroundings. Thermal imaging of 21 wild-life mushroom species revealed that each was colder than their natural environment, as shown in FIGS. 8A-8F and Table 1. The temperature of stalks recorded for some wild specimens was similar to the pilei. Yeast colonies and mold biofilms of *Candida* spp., *Cladosporium* spp., *Penicillium* spp., and *Rhodotorula mucilagenosa* also exhibited lower temperatures than the surrounding agar media following 1 h incubation at 45° C., as shown in FIGS. 8G-8J. The temperature differences between the fungus and its surroundings averaged ~2.5° C. and varied from ~0.5 to 5° C., depending on the fungal specimen, as shown in FIG. 8K. The mushrooms of *P. ostreatus* and *Cerrena unicolor* showed larger temperature differences; ~5° C. cooler than ambient temperature. The temperatures of all fungal specimens correlated linearly with surrounding temperatures at a slope of 1 and x, y-intercepts of ~2° C., as illustrated in FIG. 12.

TABLE 1

| Fungal Specimen | ID# | fungal specimen ° C. | | | Surrounding temperature ° C. | | | Mean Difference |
| --- | --- | --- | --- | --- | --- | --- | --- | --- |
| | | average | max | min | average | max | min | |
| Yeast and molds | | | | | | | | |
| *Candida* spp. | 1 | 36.9 | 37.4 | 36.6 | 38.2 | 38.15 | 38.1 | 1.3 |
| *Candida* spp. | 2 | 40.6 | 40.7 | 40.6 | 41.3 | 41.9 | 40.7 | 0.7 |
| *Cladosporium sphaerospermum* | 3 | 38.7 | 39.4 | 38.2 | 41.3 | 41.9 | 40.7 | 2.6 |
| *Penicillium* spp. | 4 | 28.7 | 29 | 28.2 | 30.6 | 30.7 | 30.4 | 1.9 |
| *Rhodotorula mucilaginosa* | 5 | 33.8 | 33.8 | 33.7 | 36.9 | 37 | 36.9 | 3.1 |
| Mushroom caps (and stalks) | | | | | | | | |
| *Amanita* spp. | 6 | 23.8 (23.9) | 24.1 (23.8) | 23.7 (24.1) | 26.1 | 26.2 | 26.1 | 2.3 |
| *Pleurotus ostreatus* | 7 | 26.6 | 26.7 | 26.6 | 31.7 | 31.9 | 31.3 | 5.1 |
| *Amanita muscaria* | 8 | 24.6 (24.4) | 24.4 (24.1) | 24.7 (24.6) | 27.3 | 27.2 | 27.4 | 2.7 |
| *Amanita brunnescens* | 9 | 24.7 (24.9) | 24.7 (24.8) | 24.8 (25.0) | 26.5 | 26.4 | 26.6 | 1.8 |
| *Russula* spp. | 10 | 24.8 (24.9) | 24.7 (24.8) | 25.2 (25.1) | 27.4 | 27 | 27.6 | 2.6 |
| *Boletus separans* | 11 | 26.2 | 25.9 | 26.5 | 29.5 | 29.1 | 30 | 3.3 |
| *Russula* spp. | 12 | 24.1 (24.5) | 24.0 (24.4) | 24.3 (24.5) | 26.7 | 26.5 | 26.8 | 2.6 |
| *Amanita* spp. | 13 | 24.6 (24.5) | 24.5 (24.3) | 24.8 (24.7) | 26.3 | 26.2 | 26.6 | 1.7 |
| *Thelephora* spp. | 14 | 25.6 | 25.3 | 25.9 | 28.7 | 28.3 | 28.9 | 3.1 |
| *Cerrena unicolor* | 15 | 29 | 28.6 | 29.2 | 34.1 | 33.2 | 34.6 | 5.1 |
| *Cantharellus* spp. | 16 | 23.8 | 23.7 | 23.9 | 25.8 | 25.7 | 26 | 2 |
| *Russula* spp. | 17 | 24.4 (24.2) | 24.2 (24.1) | 24.7 (24.2) | 25.8 | 25.7 | 25.9 | 1.4 |
| *Hortiboletus* spp. | 18 | 24.2 (24.0) | 24.1 (24.0) | 24.3 (24.0) | 26.7 | 26.5 | 26.8 | 2.5 |
| *Marasmius capillaris* | 19 | 24.5 | 24.4 | 24.6 | 26.4 | 26.3 | 26.5 | 1.9 |
| *Coprinellus micaceus* | 20 | 26.8 | 26.5 | 27 | 29.7 | 29.6 | 29.8 | 2.9 |
| *Lactifluus* spp. | 21 | 23.9 (23.7) | 23.9 (23.6) | 24 (23.9) | 25.4 | 25.3 | 25.5 | 1.5 |
| unknown | 22 | 23.7 | 23.7 | 23.8 | 27.9 | 27.8 | 28 | 4.2 |
| unknown | 23 | 23.7 (23.9) | 23.5 (23.7) | 23.8 (24.1) | 25.4 | 25.3 | 25.5 | 1.7 |
| unknown | 24 | 24.9 | 24.7 | 25 | 26.8 | 26.5 | 27 | 1.9 |
| unknown | 25 | 22.6 | 22.5 | 22.7 | 26 | 26.9 | 25.7 | 3.4 |
| unknown | 26 | 25.6 | 25.6 | 25.7 | 27.4 | 27.1 | 27.9 | 1.8 |

Figure 9A:
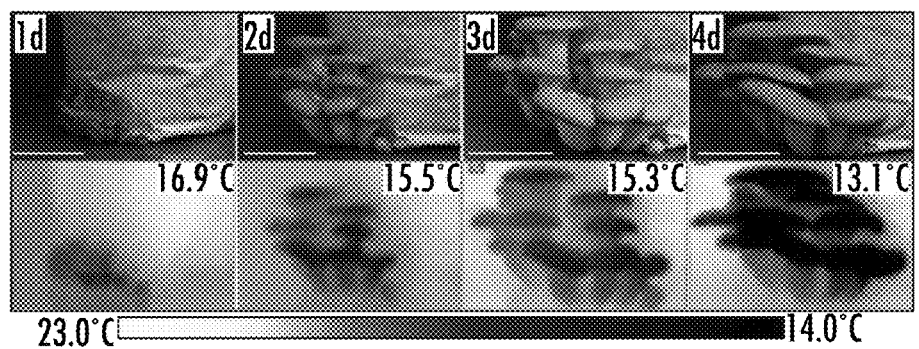
FIGS. 9A-9D illustrate image and thermographic views of changes in mushroom temperature during fruiting and during heating and cooling.
Figure 9B:
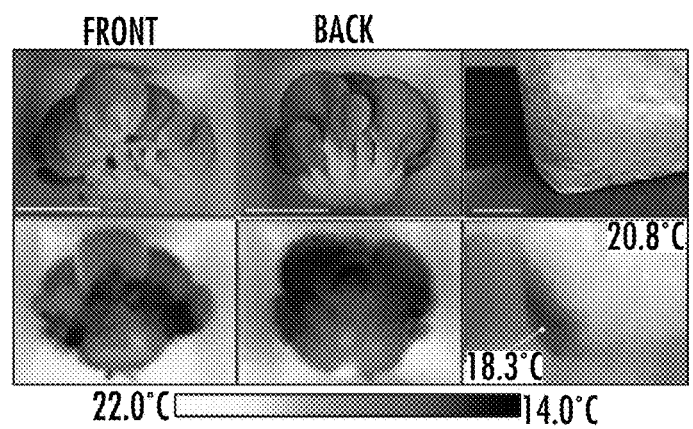
Figure 9C:
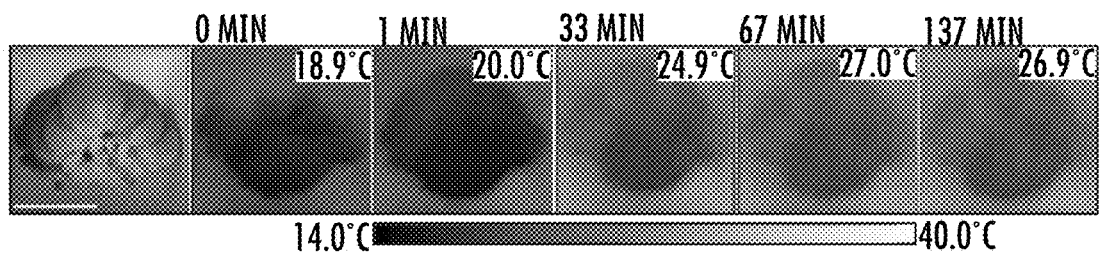
Figure 9D:
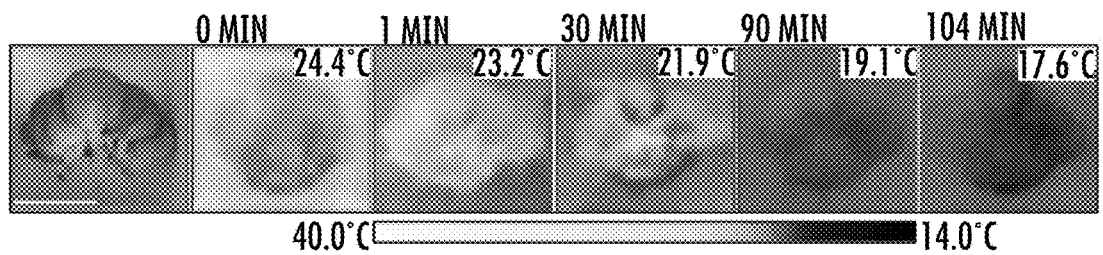

FIGS. 9A-9D illustrate image and thermographic views of changes in mushroom temperature during fruiting and during heating and cooling. FIG. 9A illustrates visible and thermal images of *Pleurotus ostreatus* during fruiting at temperature-controlled room (22±5° C., 50% RH). Inset temperature values correspond to the lowest temperature signal registered in the thermograph. FIG. 9B illustrates frontal and back imaging of mushrooms and mycelium bag after detachment at day 4. FIG. 9C shows thermal imaging of *P. ostreatus* following incubation inside warm room at 37° C., <10% RH. FIG. 9D shows the subsequent incubation inside a cold room at 4° C., ~30% RH. Inset temperature values correspond to the lowest and highest temperature signal in the thermographs in FIGS. 9C and 9D, respectively. *Pleurotus ostreatus* grown in the laboratory at 25° C. revealed coldness throughout the whole fruiting process, is shown in FIG. 9A. Colder temperatures were recorded over time, as the mushroom flush grew in size. The mushroom flush remained relatively cold after detachment, although several degrees warmer. The gills area underneath the pileus or hymenium appeared colder than the frontal side of *P. ostreatus* pilei or stalk, as illustrated in FIG. 9B. Notably, the fruiting site of the mycelium also remained relatively cold after mushroom detachment, approximately 2.5° C. cooler than the rest, further as illustrated in FIG. 9B. The relatively cold temperature of the *P. ostreatus* mushroom was maintained during heating, increasing from approximately 19 to 27° C. following 137 minutes incubation at 37° C. (<10% relative humidity, RH), as illustrated in FIG. 9C. After heating, the mushroom flush was incubated at 4° C. (<10% RH), and its temperature dropped from 24 to 18° C. after 104 minutes, as illustrated in FIG. 9D. A comparison of the thermal images of the mushroom flush during heating and cooling incubations showed that different areas of the mushroom dissipate heat differently.

Figures 10A, 10B, 10C:
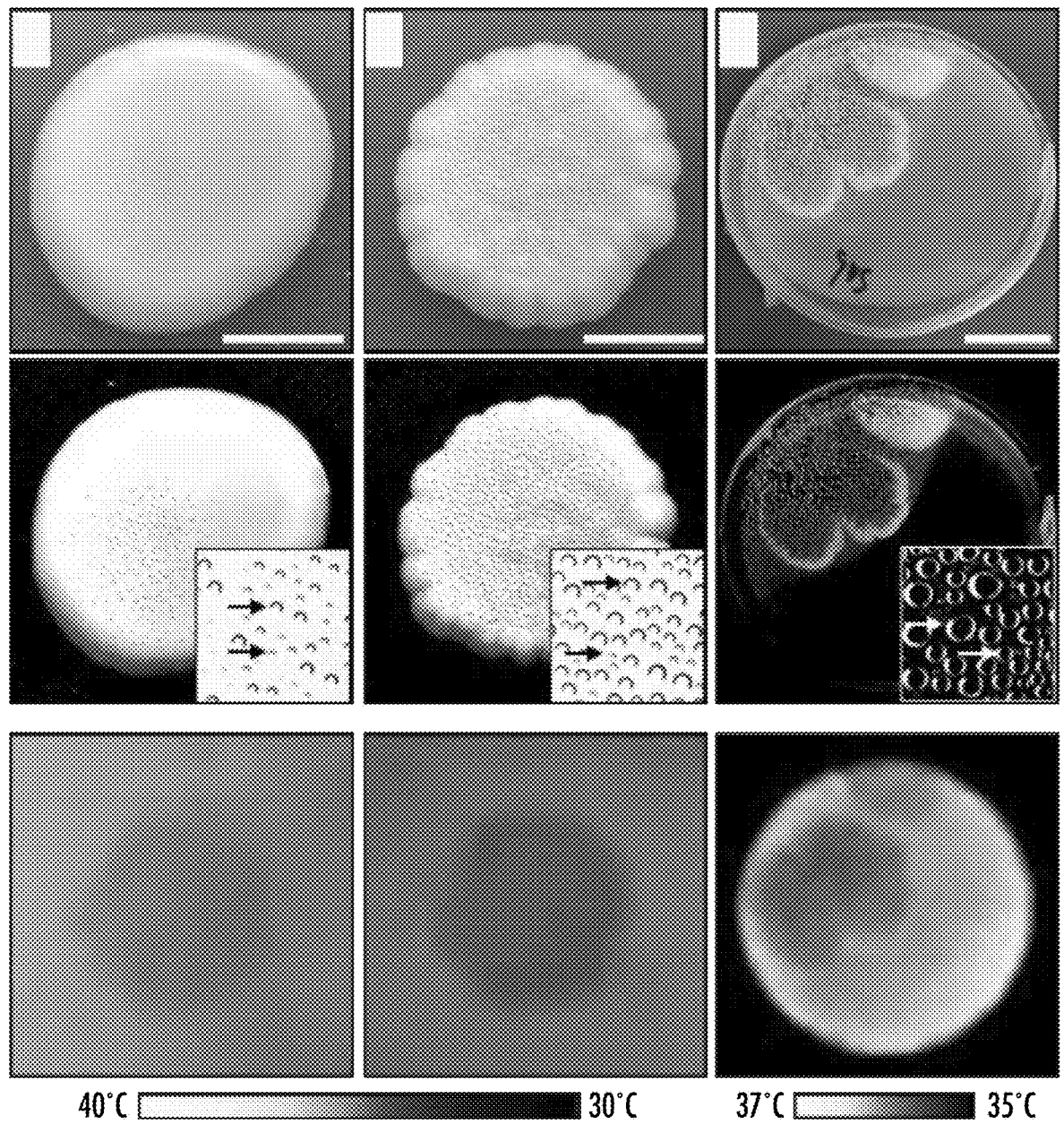
FIGS. 10A-10C illustrate image and thermographic views of evaporative cooling in yeast and mold biofilms.

FIGS. 10A-10C illustrate image and thermographic views of evaporative cooling in yeast and mold biofilms. Evidence for evaporative cooling is observed from the condensed water droplets at the lid of petri dish on top of colony/biofilm. Visible (top and middle) and thermal images (bottom) of FIG. 10A wildtype H99 *Cryptococcus neoformans*; scale bar 1 cm; FIG. 10B illustrates Δcap59 acapsular2 mutant of *C. neoformans*; scale bar 1 cm, and normal *Penicillium* spp.; scale bar 3 cm. Visible images were altered to increase contrast and help visualize water droplets (middle row). Evaporative cooling in yeast and molds was evident from the condensation of water droplets on the lids above *Cryptococcus neoformans* and *Penicillium* spp. biofilms were grown upright on agar plates. An acapsular mutant of *C. neoformans* showed more and larger water droplets than the encapsulated wildtype strain, as illustrated in FIGS. 10A and 10B. The encapsulated *C. neoformans* colonies are ~90% water, while the acapsular mutant is ~82%, as shown in Table 2. The mutant strain was also ~1° C. colder than the encapsulated strain. Biofilms of *Penicillium* spp. showed significant condensation of water droplets, as illustrated in FIG. 10C, at least ~10 times higher than the surrounding 1.5% agar medium, as shown in Table 3.

Table 2 shows water mass percentage of *A. bisporous* mushroom caps and *C. neoformans* yeast colonies. Percentage water mass was calculated by the mass difference before and after lyophilization. Values represent different biological replicas.

| Specimen | Percent of water (% m/m) |
| --- | --- |
| *A. bisporus* mushroom caps | 93.6 ± 0.4* |
| Encapsulated *G. neoformans* | 90.2, 89.7, 89.0, 89.6 |
| Acapsular *C. neoformans* | 81.8, 81.8, 82.3, 81.5 |
| Unidentified specimens | 83.3, 88.1, 89.9, 91.6, 82.1, 80.7, 57.4 |

*average and standard deviation from three light and three darkly pigmented specimens.

Table 3 shows total water mass condensed on lids divided by biofilm or agar area.

| | Water mass per area (mg/m2) | |
| --- | --- | --- |
| sample | biofilm | agar |
| 1 | 6.4 | 0.2 |
| 2 | 10.0 | 0.8 |
| 3 | 5.0 | 0.4 |
| 4 | 3.6 | 0.4 |

Figure 11A:
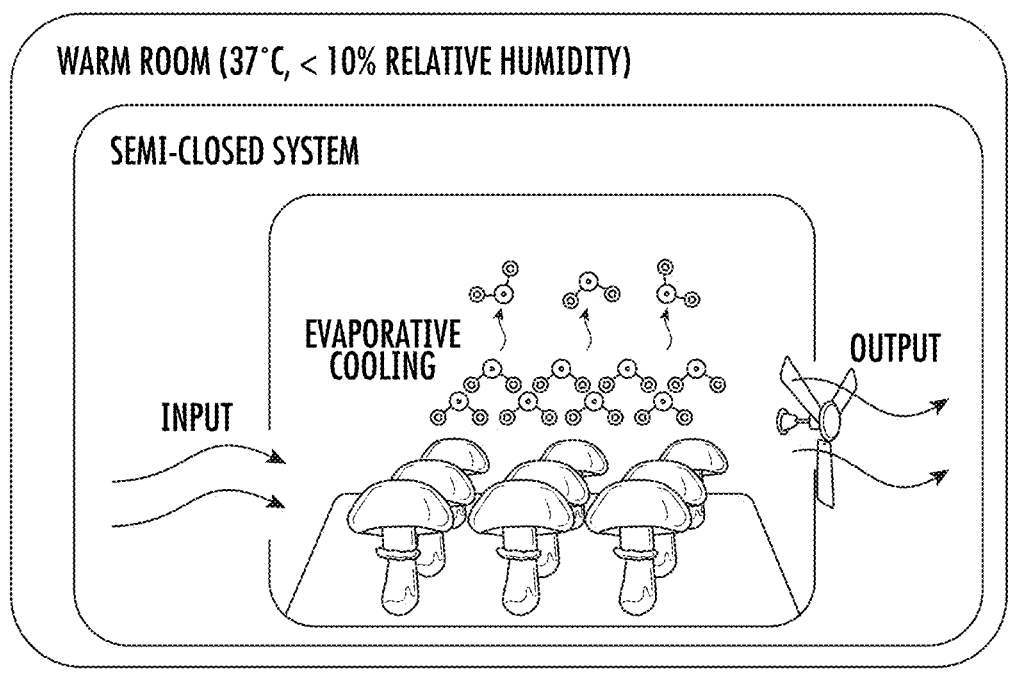
FIGS. 11A and 11B illustrate a schematic view of a device for cooling according to the present invention and a graphical view of input and output air temperature for the present invention.
Figure 11B:
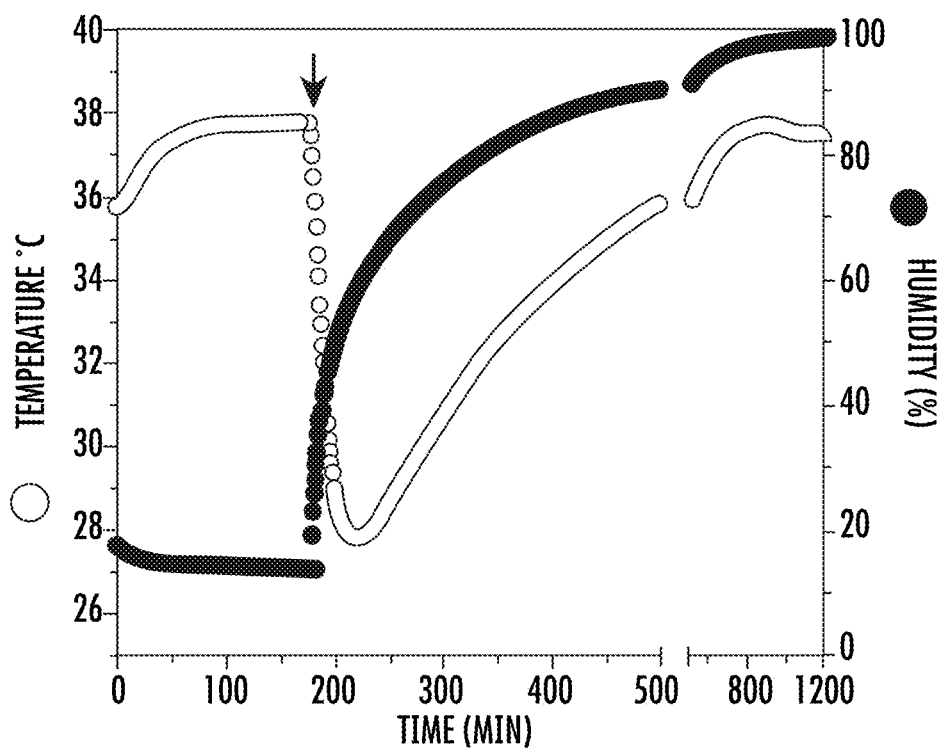

FIGS. 11A and 11B illustrate a schematic view of a device for cooling according to the present invention and a graphical view of input and output air temperature for the present invention. FIG. 11A illustrates that warm air enters an insulated chamber containing mushrooms. As the warm air flows inside the chamber, mushroom-mediated evaporative cooling will cool the air. An exhaust fan will push the cooled air through a HEPA filter to limit spore dispersal and enhance air circulation. The fan can be powered via a photovoltaic cell making this system free of carbon emissions. FIG. 11B illustrates that input and output air temperature and relative humidity as a function of time. A prototype of a device of the present invention was placed inside a semi-closed Styrofoam box. Mushrooms were added once the temperature inside the semi-closed system reached steady-state (black arrow).

The prototype device, which was constructed using a Styrofoam box with a 1-cm diameter inlet aperture and a 2-cm diameter outlet aperture, like the device illustrated in FIG. 7A. An exhaust fan was attached outside the outlet aperture to drive airflow in and out of the box, as illustrated in FIG. 7B. The device was loaded with ~420 grams of *A. bisporus* mushrooms, closed, and placed inside a larger Styrofoam box, as illustrated in FIG. 7C. The device was previously equilibrated inside a warm room (37° C., <10% RH). Forty minutes after the addition of mushrooms, the temperature inside the closed Styrofoam box decreased approximately 10° C. at ~0.4° C. per min, and the humidity increased to ~45% at 1.3% per minute, as illustrated in FIG. 11B. While the humidity continued to increase, the air temperature reached a minimum at ~60% RH, at which point it started to increase back to initial temperature values, as illustrated in FIG. 11B. From this data, it was estimated that 420 grams of *A. bisporus* mushroom pilei have an air-cooling capacity of approximately 20 Watts or 68 BTH/hr. The change in air temperature was proportional to change in humidity, confirming evaporative cooling as the mechanism for mushroom hypothermia. The device of the present invention provides a proof-of-principle for harnessing mushroom's cooling capacity for cooling air in enclosed environments.

FIG. 12 illustrates a graphical view of fungal temperature as a function of surrounding temperature. Linear regression analysis of yeast, mold, and mushroom cap temperatures as a function of ambient temperature. Slope 0.988, R2 0.95, Y-intercept −2.14° C., X-intercept 2.16° C. The grey line shows the line of identity.

Figure 13A:
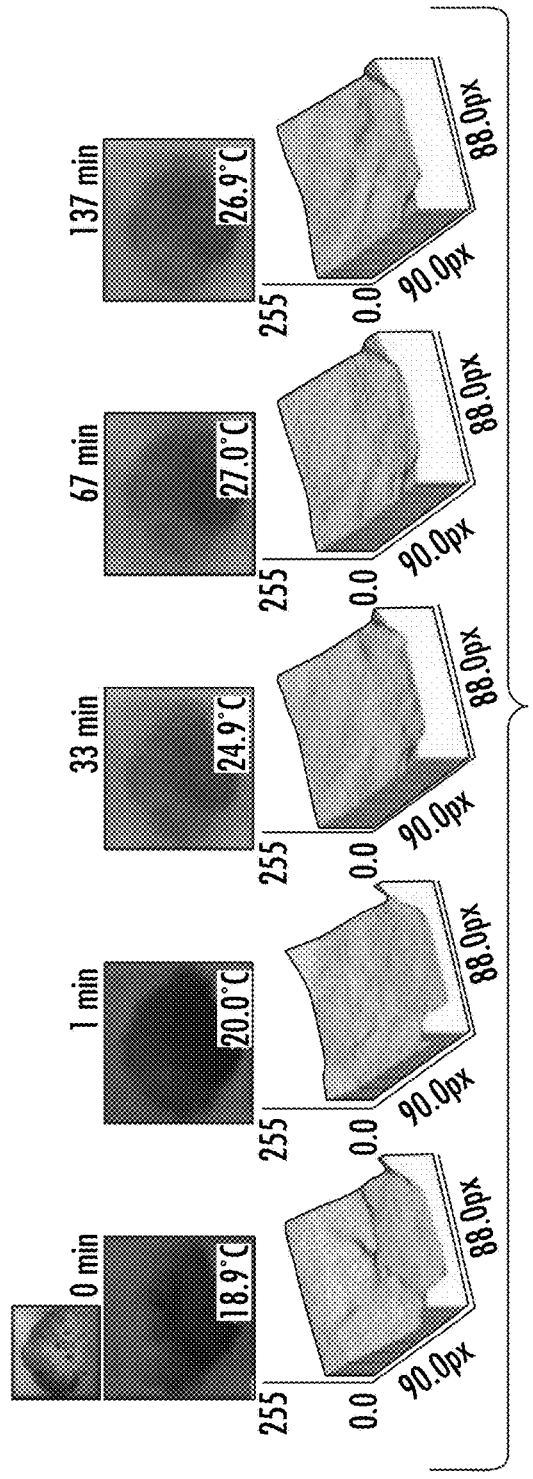
FIGS. 13A and 13B illustrate thermal images and plot profiles of mushrooms incubated in a warm room.
Figure 13B:
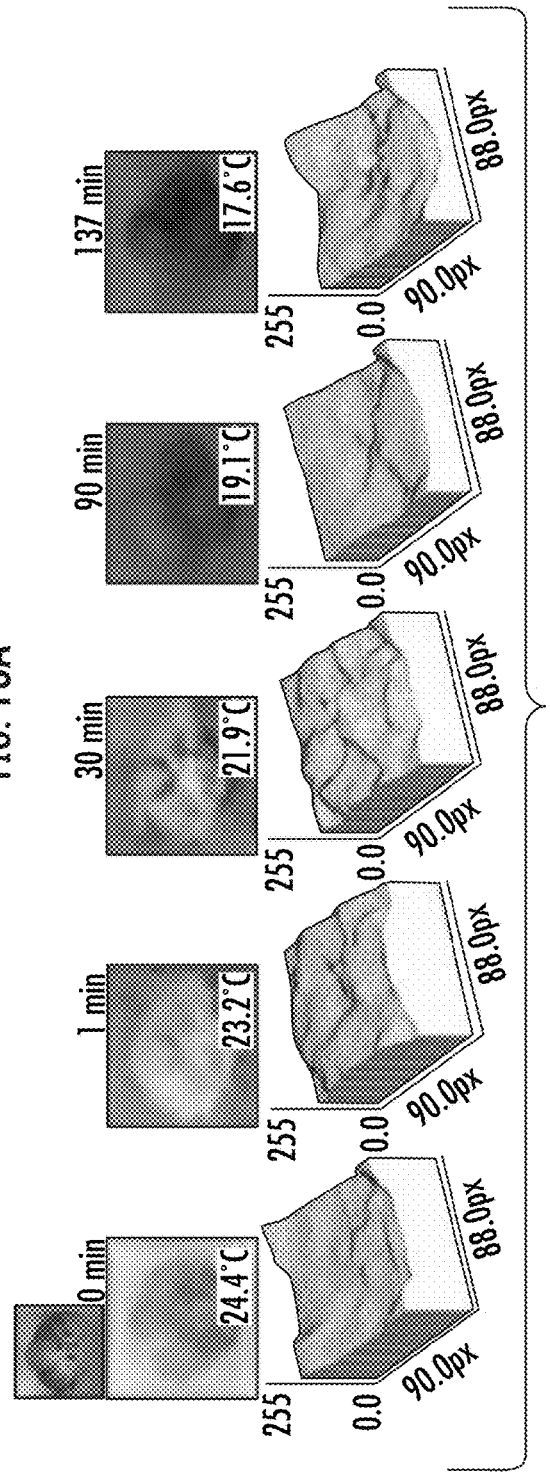

FIGS. 13A and 13B illustrate thermal images and plot profiles of mushrooms incubated in a warm room. FIG. 13A illustrates incubation at 37° C. (and <10% RH) and a cold room. FIG. 13B illustrates incubation at 4° C. (and ~30% RH). Inset temperature values correspond to the lowest and highest temperature signal detected in the thermographs in FIGS. 13A and 13B, respectively. The changes in mushroom temperature during cooling manifested more irregular thermal gradients when compared to the heating incubation as illustrated in FIGS. 13A and 13B.

Figure 14A:
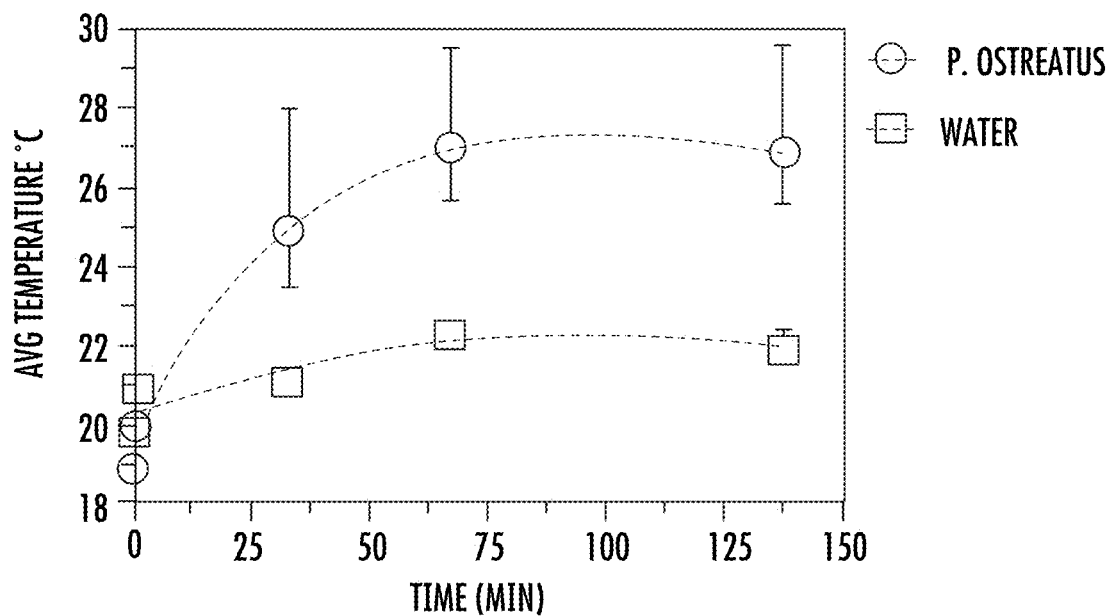
FIGS. 14A and 14B illustrate graphical views of average temperature over time following incubation with *P. ostreatus*.
Figure 14B:
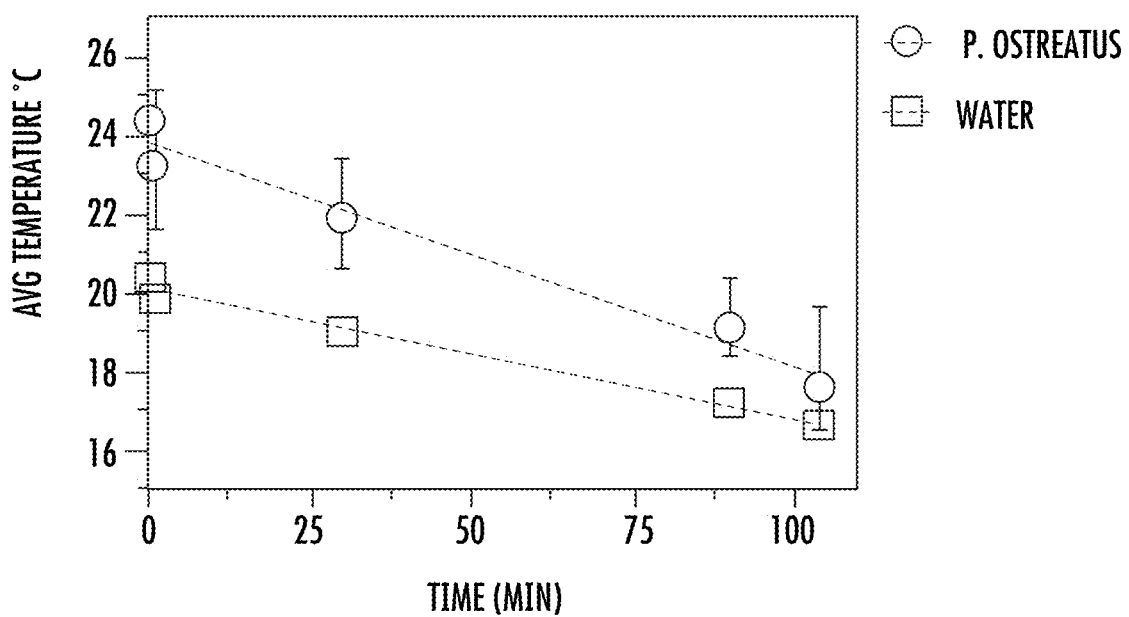

FIGS. 14A and 14B illustrate graphical views of average temperature over time following incubation with *P. ostreatus*. *P. ostreatus* average temperature following incubation at 37 and 4° C., are illustrated in FIGS. 14A and 14B, respectively. An equivalent mass of pure water was co-incubated and used as reference. The change in average mushroom temperature as a function of time followed an exponential curve during heating but a linear curve during cooling.

Figure 15C:
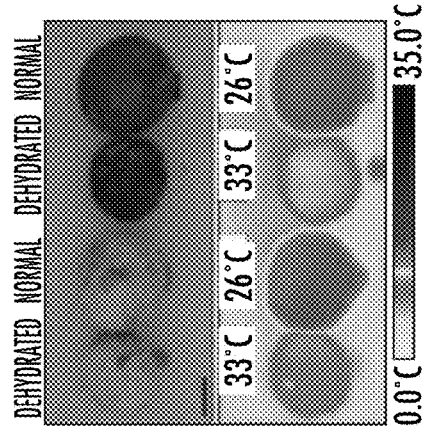
FIGS. 15A-15E illustrate image views and thermal views of Dehydrated (left) and normal (right) version of white and brown *Agaricus bisporus* mushrooms were incubated at: 4° C., as illustrated in FIG. 15A, 23° C., as illustrated in FIG. 15B, and 37° C. ambient temperatures, as illustrated in FIG. 15C.
Figure 15B:
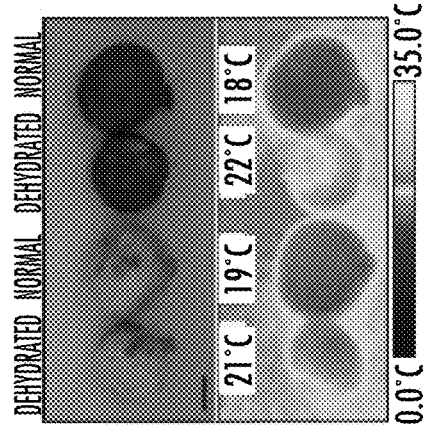
Figure 15A:
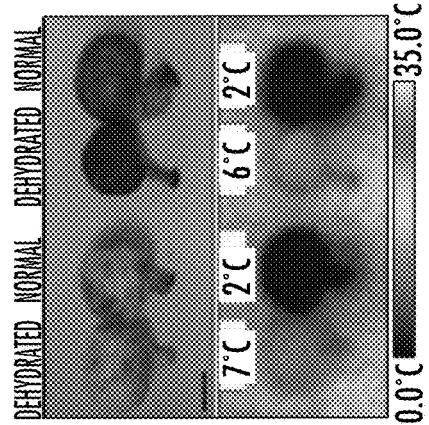
Figure 15E:
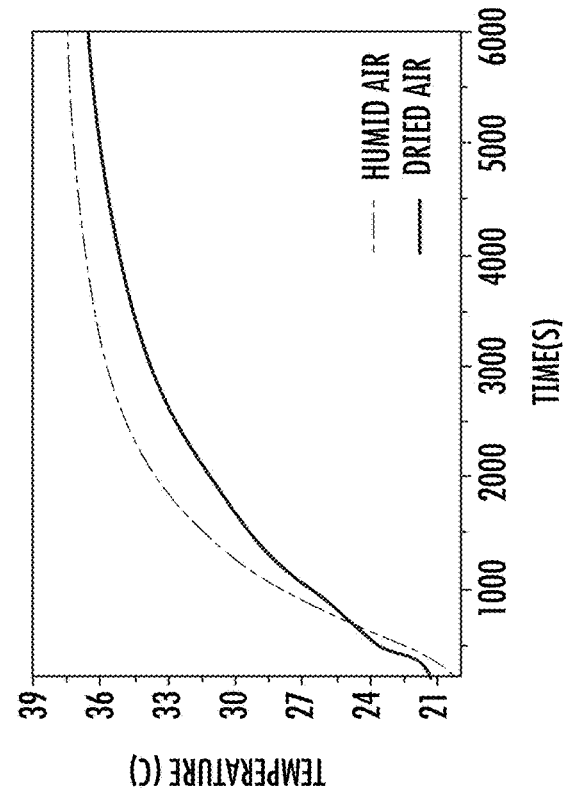
Figure 15D:
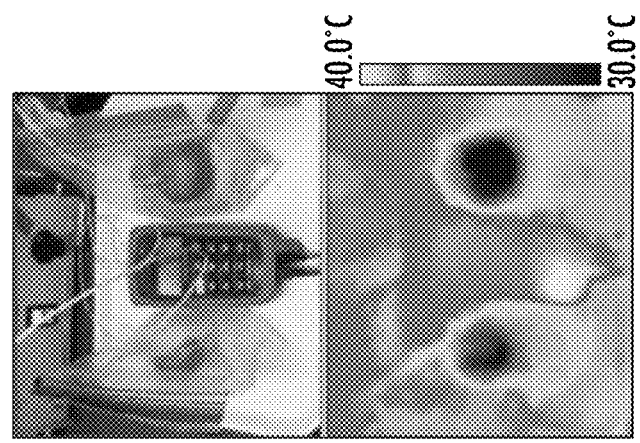

FIGS. 15A-15E illustrate image views and thermal views of Dehydrated (left) and normal (right) version of white and brown *Agaricus bisporus* mushrooms were incubated at: 4° C., as illustrated in FIG. 15A, 23° C., as illustrated in FIG. 15B, and 37° C. ambient temperatures, as illustrated in FIG. 15C. Normal mushrooms are able to maintain cooler temperatures regardless of the ambient temperature. FIG. 15D illustrates an image view of an experimental setup to monitor mushroom temperature change as a function of humidity. FIG. 15E illustrates a graphical view that mushroom temperature as a function of time was recorded inside plastic bags closed (top) and opened (bottom).

Fungal hypothermia is mediated by evaporative cooling. Evaporative cooling was confirmed in light and dark *A. bisporus* mushroom pilei by manipulating its water content and ambient temperature-humidity. Dehydrated mushrooms are no longer able to maintain relative colder temperatures, irrespective of ambient temperature, as illustrated in FIGS. 15A-15C and Table 4. Similar temperature changes were observed between light and dark mushrooms pilei. The percent mass loss of light and dark *A. bisporus* mushroom pilei following dehydration was 93.6±0.4% w/w. Table 4, demonstrates the high-water content. Dehydration of seven additional wild fungal unidentified specimens also shows high water content ranging from 57 to 92 percent by mass. Table 4 also shows mushrooms warmed slower and reached lower absolute temperatures under a dry environment as compared to a humid environment, as illustrated in FIGS. 15D and 15E. Together these results confirmed that mushroom's relative coldness was mediated by evaporative cooling.

Table 4 shows temperatures (average ° C., max/min of light and dark *A. bisporous* mushroom caps in normal versus dehydrated states following 1 h incubation at 4, 24, and 37° C.).

| Ambient | Light | | | | | | Dark | | | | | |
|---|---|---|---|---|---|---|---|---|---|---|---|---|
| | Normal | | | Dehydrated | | | Normal | | | Dehydrated | | |
| Temp | avg | max | min | avg | max | min | avg | max | min | avg | max | min |
| 4 | 1.7 | 2.2 | 1.4 | 6.9 | 8.0 | 6.1 | 1.6 | 2.7 | 1.1 | 6.4 | 7.2 | 5.6 |
| 24 | 18.8 | 20.0 | 17.9 | 20.1 | 21.7 | 18.9 | 18.1 | 19.2 | 17.6 | 21.7 | 22.5 | 21.0 |
| 37 | 26.3 | 27.3 | 24.7 | 32.9 | 33.3 | 32.0 | 26.4 | 27.6 | 24.8 | 33.3 | 33.8 | 31.5 |

This thermographic study reveals that mushrooms, molds, and yeast can maintain colder temperatures than their environment, implying that hypothermia is a general property of the fungal world. Mushroom coldness occurred throughout the fruiting process, and the fruiting area of mycelium also became relatively cold. Mushroom coldness occurs via transpiration and that this process also occurs in mold and yeast biofilms. A mushroom-based air-conditioning device according to the present invention is capable of passively cooling and humidifying the air of a closed environment. The data presented here reveal the cold nature of fungal biology and evaporative cooling as a microbiological mechanism of thermoregulation.

The observation that fungal temperatures correlated to ambient temperature are consistent with the notion that fungi are poikilotherms. The cold temperatures of wild mushroom specimens relative to ambient temperature suggest that mushrooms are very effective at dissipating heat. The temperature of wild mushroom pilei varied between specimens, which suggests that there are species-specific capacities to dissipate heat that must be related to differences in still unknown thermal properties (i.e., heat capacity, thermal conductivity). The relatively cold temperatures of yeast colonies and mold biofilms were only visible after incubation in a warm/dry environment. At steady states in ambient temperature, the infrared imaging contrasting resolution was not sufficient to detect temperature differences between the colony/biofilm and the surrounding agar. The temperature difference becomes apparent as yeast colonies and mold biofilms can dissipate more heat than the surrounding agar, which is ~98% water. Although no examples were found, the existence of mushrooms, yeasts, or molds capable of reaching warmer temperatures than their surroundings is certainly possible. Factors such as pigmentation and radiation exposure can influence fungal temperatures. Unicellular yeasts and mushrooms produce pigments, such as melanins, that can increase heat capture from radiation energy. For instance, approximately 1 gram of darkly pigmented yeasts can reach >5° C. warmer than the ambient temperature within minutes of sunlight exposure. The identification of heat-producing bacteria suggests that a microbial community can produce enough thermal energy and maintain warmer temperatures than the surroundings. More thermal information of microbial specimens is needed to reveal any potential thermal patterns between fungal genera, species, and lifestyles.

The mushroom coldness was observed during the whole *P. ostreatus* fruiting process. The decrease in temperature during fruiting appeared to be proportional to the mushroom size, which is likely related to an increase in mushroom thermal mass or to an unknown age-related structural organization mediating more heat loss. The observation that the mushroom is coldest when still attached to the mycelium is consistent with prior observations and indicates that heat loss is highest when connected to the mycelial network, which provides access to water. This increase in temperature after detachment is also observed in leaves. The observation that the fruiting site of mycelium remained relatively cold after mushroom detachment suggests that mushroom heat loss translates to the mycelium level. The thermal images of *P. ostreatus* mushroom also suggest that heat dissipation is more efficient at certain discrete areas on the mushroom flush. The relatively cold temperatures recorded underneath the mushroom cap make sense considering the relatively high surface area exposed by the gills. The different spatiotemporal changes in mushroom temperature during heating and cooling incubations suggests that discrete areas of the mushroom are more efficient at gaining or dissipating heat. Different areas of the mushroom may contain different hyphal structural organizations and/or water content affecting transpiration rates and thermal properties. The change in *P. ostreatus* mushroom average temperature during heating and cooling resembles the phenomena of thermal hysteresis, a process where previous heat dissipation events influence subsequent heat exchanges and temperature changes.

The data shows that fungal hypothermia is mediated via the evaporation of fungal-associated water. In plants, transpiration occurs mainly at the leaf level and is regulated via stomas, but any analogous structure in mushrooms has not been identified. The data with light and dark *A. bisporus* mushroom pilei confirm that evaporative cooling accounts for mushroom coldness. Both light and dark mushroom pilei exhibited similar temperature changes, which suggest that pigmentation has an effect too close to the limits of thermal detection or no effect on heat dissipation in mushroom pilei. The high-water content of mushrooms is consistent with previous reports and explains their high transpiration capacity. Their high-water content implies that mushroom's thermal properties must be close to those of liquid water. Other fruits are also highly hydrated (i.e., cucumber); however, it is unknown how their transpiration rate compares to those of mushrooms.

The data on yeast and molds biofilms also suggest that evaporative cooling accounts for their relatively cold temperatures. The condensed water on the plastic cover above yeast and molds biofilms provides evidence for evaporative cooling. The difference in water content between the encapsulated and acapsular mutant colonies of *Cryptococcus* can be explained by the capsule, which is mostly water. Although the acapsular mutant of *C. neoformans* contains ~10% less water mass, it shows more water condensation and colder temperatures relative to the encapsulated strain. The data suggest that the capsule can retain water from evaporating, which would be consistent with the proposed role of microbial capsules in preventing desiccation in the environment. The observed differences between a normal and a mutant of *Cryptococcus* biofilms also suggest that water condensation and biofilm temperature may serve as proxies in genome-wide genetic screens for the identification of molecular mechanisms of thermoregulation in yeast.

What is the biological advantage of fungal hypothermia? Mushrooms are considered the reproductive organ of mycelium, and their relatively cold temperature are proposed to be important in spore release. Spore discharge is trigger by the mass and momentum transfer of microscopic drops of fluids on the spore surface (aka Buller's drop). Buller's drop is formed by the condensation of water from the moist air. The increased surface area by the gills is believed to enhance the airflow and water condensation, further favoring spore detachment. In addition to spore discharged, cold temperatures could have a more fundamental role in fungal sporogenesis. There are many examples in nature were sporogenesis is associated with cold temperatures (i.e., human spermatogenesis). Fungal hypothermia may be a biological advantage related to DNA recombination fidelity.

Understanding the mechanisms of fungal thermoregulation is important for the development and optimization of novel biotechnologies and biomaterials. The data shows that the relatively high transpiration rate of mushrooms could be exploited to develop a natural air-conditioning device. The data is consistent with previous reports and suggests that mushrooms can be used to develop a passive air-cooling system. Mushroom-based air cooling depended on the relative humidity, and for detached *A. bisporus* mushroom pilei, evaporative cooling is compromised at relative humidity close to 60%. Subsequently, the transpiration rate of mushrooms can be used to humidify the surrounding air. Better results could be achieved using mushroom species with higher transpiration rates, still attached to their mycelium, and on a device that regulates the accumulation of moisture. Mushrooms can be used not only to cool the surrounding air but also to humidify and even purify it without electricity and $CO_2$ emissions. These findings suggest the possibility of using massive myco-cultures for cooling selected environmental areas and even the planet. For example, extensive myco-culture in soils shaded by forests could reduce the temperatures of these locales that could mitigate global warming trends, at least locally. Given that fungi live on soils and comprise 2% of the earth biomass, that fungi are 2-4° C. cooler than their environment, that the average surface temperature of the earth is ~14° C., and assuming linearity in heating and cooling, it is estimated that without fungi the temperature of the planet would be 0.25-0.5% warmer.

In conclusion, the cold nature of fungal organisms and evaporative cooling as a fundamental mechanism for heat loss and thermoregulation for this kingdom. Fungal hypothermia implies that their heat loss is much greater than the production of heat via metabolism. Their relative cold temperatures also imply that the flow of surrounding thermal energy will move towards the fungus. The high-water content and transpiration rate of fungi implies that their molecular composition and structure enables the efficient transfer of thermal energy and water. Infrared imaging enables the study of mushrooms, molds, and yeasts as novel model systems to study thermal biology and thermodynamics at the community level. A yeast model to study thermal biology is interesting as it could allow the screening of genetic and epigenetic mechanisms regulating thermodynamics and thermal fitness. Understanding how fungal organisms dissipate heat can inspire novel biotechnologies for air-conditioning and the building of infrastructures.

All wild mushrooms specimens were obtained from Lake Roland Park in the State of Maryland. Partial and non-official identification of specimens was made based on a visual inspection and photograph analysis via crowdsourcing the Internet. *Candida* spp., *Clodosporium* spp., and *Penicillium* spp. were obtained from mosquito gut isolates by the Dimopoulos Laboratory at the MMI Dept. *Rhodotorula mucilaginosa* was isolated from a contaminated YPD agar plate. *C. neoformans* Serotype A strain H99 (ATCC 208821), acapsular cap59 mutant yeasts and *Penicillium* spp. molds were grown in Sabouroaud Dextrose agar or liquid media for 3-5 days at 30° C. and 24° C., respectively. *Pleurotus ostreatus* was purchase from The Mushroomworks (Baltimore, MD) as an already-inoculated substrate contained in a 6-pound clear filter patch bag. Fruiting was triggered by making a single 4-inch side cut on the bag and let standstill at 24° C. for seven days. Mushroom flush was detached from mycelium on day four after it started fruiting. Light and dark *Agaricus bisporus* were purchased from New Moon Mushrooms (Mother Earth, LLC., Landenberg, PA, USA) and L. Pizzini & Son, Inc. (Landenberg, PA, USA), respectively.

Figure 16A:
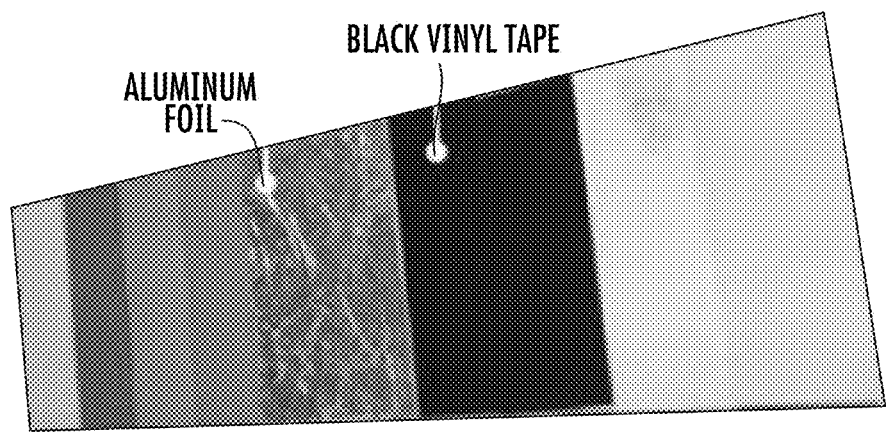
FIG. 16A illustrates a reference card containing black vinyl tape and aluminum foil. Black vinyl tape as reference for ambient temperature.
Figure 16B:
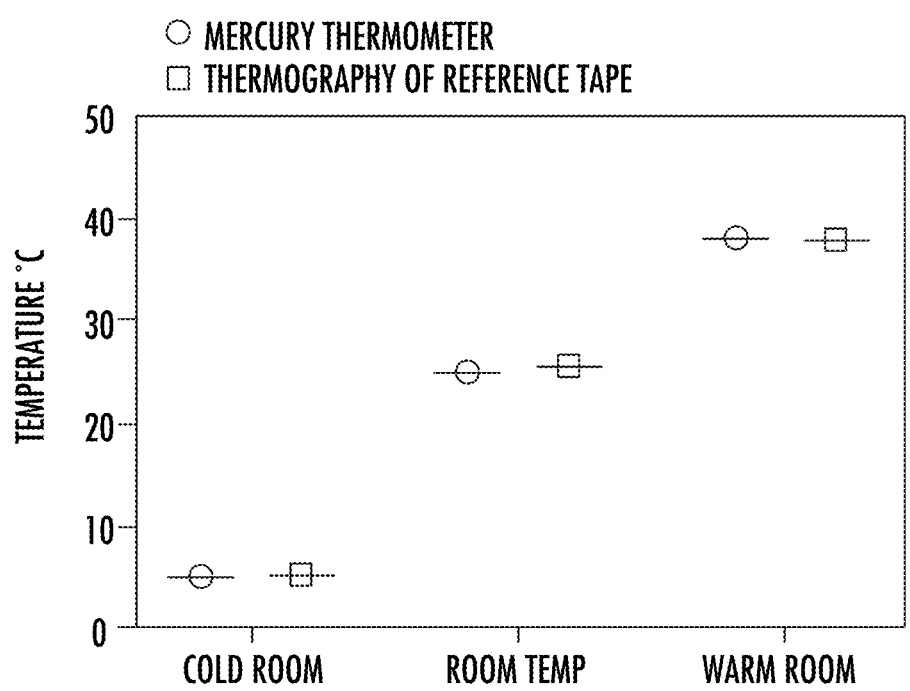
FIG. 16B illustrates a graphical view of temperature measurement inside a cold (5° C.), warm (37° C.), and regular (25° C.) rooms using a mercury thermometer and thermography of reference card-black tape.

Wild mushroom temperatures were measured using a FLIR C2 IR camera (FLIR Systems, Wilsonville, OR). The camera specifications are 80×60-pixel thermal resolution; 640×480-pixel visual camera resolution; 7.5-14 µm spectral range of camera detector; object temperature range of −10 to 150° C., accuracy ±2° C. or 2%, whichever is greater, at 25° C. nominal; thermal sensitivity: <0.10° C.; adjusted emissivity to 0.96. The ambient temperature was derived from a card-containing black vinyl electrical tape with an emissivity of 0.96 and aluminum foil (emissivity 0.03). FIG. 16A illustrates a reference card containing black vinyl tape and aluminum foil. Black vinyl tape as reference for ambient temperature. FIG. 16B illustrates a graphical view of temperature measurement inside a cold (5° C.), warm (37° C.), and regular (25° C.) rooms using a mercury thermometer and thermography of reference card-black tape. The black tape and aluminum foil were included in the picture as a reference for ambient and reflective temperature readings, respectively, as illustrated in FIG. 16A. How effective is the black vinyl tape to reproduce ambient temperatures? This was tested by thermal imaging of the reference card following ~20 minutes incubation inside three temperature-controlled rooms, set to approximately 5, 25, and 38° C. The temperature readings obtained from the black tape using the thermal camera were 5.2 (5.2/5.4 min/max), 25.5 (25.5/25.5 min/max), and 37.9 (37.7/38.1 min/max) ° C., respectively; demonstrating that black tape radiative temperature corresponded to the ambient temperature. The temperature readings between the thermal camera and a mercury thermometer matched clearly, as illustrated in FIG. 16B, confirming that black tape radiative temperature matched the temperature of rooms, hence serving as a useful reference for ambient temperature.

The thermography of yeast and molds colonies/biofilms was done similar to was described previously. Thermal images of yeast, molds, and commercial mushrooms (*P. ostreatus* and *A. bisporus*) were taken inside a white Styrofoam box (30×27×30 mm, and 3.5 mm wall thickness) to prevent heat loss and radiation noise from surroundings. Prior to imaging yeasts and mold specimens, the sample plates were incubated at 45 or 37° C. This incubation was required to detect a temperature difference between the colony and the agar as dictated by the thermal camera resolution. Following 1-hour incubation period, the yeast/mold containing plates were immediately transferred inside a Styrofoam box. Next, the box was closed with a lid having a hole fitted to a FLIR C2 IR camera (FLIR Systems, Wilsonville, OR). The camera detector is set at 2.5 nm distance from the specimen. The temperature of the *P. ostreatus* mushroom flush was monitored during heating and cooling by placing the mushroom inside a warm room (37° C., <10% RH) or cold room (4° C., ~30% RH) for 137 and 104 minutes, respectively. Thermal images of mushroom flush were taken inside the Styrofoam box at different time intervals. All apparent temperatures of yeasts, molds, and mushrooms were obtained from infrared images using the FLIR Tool analysis software Version 5.13.17214.2001. Plot profiles of thermal images were obtained using the ImageJ software.

*C. neoformans* yeast biofilms were prepared by spotting 25 μL of a liquid 2-day old pre-culture onto Sabouroaud agar medium. The liquid pre-cultures were inoculated from a frozen stock and grown for two days at 30° C. (shaking at 180 rpm). *Penicillium* spp. biofilm is naturally formed by inoculating on a Sabouroaud agar plate. Yeast and mold-inoculated plates were grown upright at 24° C. for 1-2 weeks or until water condensation on the lids became visible. The amount of condensed water at the lid above a mold's biofilm or plain agar was collected using a Steriflip® filter vacuum unit (Millipore Sigma) connected to two 50 mL conical tubes; one at each end. Suction was achieved by connecting a small tubing across the filter into one of the conical tubes. A pipet tip connected at the end of tubing facilitated the aspiration of condensed water droplets on the lid and its collection into one of the 50 mL conical for weighting. The water mass was normalized by the condensation area on the lid, which was estimated from digital images using the ImageJ software.

Mushrooms were dehydrated for five days using a freeze-drying system (Labcono, Kansas City, MO).

To monitor the temperature of *A. bisporus* mushrooms as a function of time, mushroom pilei of equal masses, kept at 24° C., were placed on glass trays inside ziplock clear bags (one mushroom per bag). One bag contained 40 grams of desiccating-anhydrous indicating Drierite (W. A. Hammond Drierite Company, LTD), and a second contained 40 grams of distilled water. Thermocouple detectors (K-type) were submerged inside each mushroom cap (centered from top). Bags were then closed and placed inside a warm room (37° C., <10% RH), and temperature readings were recorded every second using the Amprobe TMD-56 thermometer (0.05% accuracy) connected to a computer. Each mushroom sample was measured individually inside the warm room.

A prototype for a mushroom-based air-cooling device is shown in FIG. 11A. The prototype device was made using a Styrofoam box with dimensions 20×21×21 cm or a total volume of 8820 cm³. An inlet aperture of 1-cm diameter and an outlet aperture of 2-cm diameter at opposite ends of the box allowed air flow inside and outside the box containing mushrooms, as illustrated in FIG. 7A. An exhaust fan (Noctua NF-P12) was glued outside the box on top of the outlet aperture to facilitate the circulation of air (air flow rate of approximately in and out of the device, as illustrated in FIG. 7B. Approximately, 420 grams of fresh *A. bisporus* mushrooms were placed inside the box of the device, which was then closed, and placed inside a larger Styrofoam box with dimensions (30.48×30.48×30.48 cm or a total volume of 28.32 L (28,316.85 cm³). This larger box was maintained inside a warm room (37° C., <10% RH) throughout the experiment. The MycoCooler™ containing mushrooms was enclosed inside the larger box once the temperature and humidity values reached steady state. The temperature and relative humidity inside the larger Styrofoam box, as illustrated in FIGS. 7A and 7B were recorded every minute using an Elitech GSP-6 data logger having a temperature accuracy of ±0.5° C. (−20-40° C.) and humidity range 10%-90% and an accuracy of ±3% RH (25° C., 20%-90% RH).

Details for each statistical analysis, precision measures, the exact value of n (and what n represents; sample size and the number of replicates) for all shown data can be found in the figure legends. An alpha level of 0.05 was used for all statistical tests.

To calculate the mushroom's cooling capacity, the temperature change data was used to estimate the cooling capacity of 420 g of *A. bisporus* mushroom pilei. Cooling capacity was calculated using the energy equation for heat transfer $Q = m \times C_p \times \Delta T$, were m is the mass flow rate of air in kg/s, Cp is specific heat capacity of air in kJ/kg*K, and delta $\Delta T$ is the temperature difference in Kelvin. The mass flow rate of air was obtained by multiplying the density of air at 37° C. (1.006 kJ/kg*K) by the fan flow rate, 0.026 m³/s (taken from equipment specifications). This results in a mass flow rate of 0.02 kg/s, that if multiplied by the heat capacity nominal value of air at 305.15 K (1.006 kJ/kg*K) and the air temperature difference of the enclosed system before and 45 minutes after the addition of mushrooms (37° C.+273.15)−(27° C.+273.15=10 K). This yields a heat transfer or cooling capacity of ~20 Watts or 68 British thermal units per hour (BTU/h). This divided by the mass of mushrooms 0.42 kg yields ~68 Watts/kg.

To estimate the temperature of Earth without fungi, the average temperature difference of wild mushrooms was considered, which ranged from ~2-5° C., and multiply it by the estimated amount of fungal biomass, ~2%, such that the temperature associated to the fungi would be ~0.04-0.1° C. The global mean surface temperature was estimated without the fungal biomass, X=15° C.+(0.04 or 0.1° C.), such that global temperatures would be ~15.04° C. or ~15.1° C., or ~0.3-0.7% warmer.

It should be noted that the present invention can also take the form of a kit for a user to assemble. The kit can include a housing, cassettes, and fungi. The kit can also include fans for air circulation, a power source, temperature and humidity probes, and shelving on which the cassettes can be placed.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A device for cooling comprising:
   a housing defining an inlet and an outlet;
   a cassette configured to be positioned within the housing;
   a fungal specimen positioned on the cassette, wherein the cassette is configured for growth of the fungal specimen;
   a fan;
   a fluid flow path; and,
   wherein the fan is configured to direct flow of a fluid along the fluid flow path through the housing from the inlet to the outlet, wherein the fluid flow path further directs the fluid over the cassette, such that the fungal specimen positioned on the cassette cools the fluid that is directed out of the outlet.

2. The device of claim 1, wherein the fan comprises an exhaust fan coupled to the outlet to drive the flow of the fluid out of the housing.

3. The device of claim 2, further comprising a filter configured to filter fungal spores out of the fluid.

4. The device of claim 1, further comprising a temperature probe.

5. The device of claim 1, further comprising a humidity probe.

6. The device of claim 1, wherein the fungal specimen is a mushroom.

7. The device of claim 1, wherein the inlet is positioned near a bottom portion of the housing.

8. The device of claim 1, wherein the outlet is positioned near a top portion of the housing.

9. The device of claim 1, further comprising an energy source.

10. The device of claim 9, wherein the energy source further comprises a photovoltaic cell.

11. The device of claim 9, wherein the energy source comprises a solar cell.

12. The device of claim 9, wherein the housing comprises an insulating box.

13. The device of claim 12, wherein the insulating box comprises a foam box.

14. The device of claim 1, wherein the housing defines a shelf on which the cassette is positioned.

15. A kit comprising:
a housing defining an inlet and an outlet;
a cassette configured to be positioned within the housing;
a fungal specimen configured to be positioned on the cassette, wherein the cassette is also configured for growth of the fungal specimen;
a fan; and,
a fluid flow path;
wherein the fan is configured to direct flow of a fluid along the fluid flow path through the housing from the inlet to the outlet, wherein the fluid flow path further directs the fluid over the cassette, such that the fungal specimen positioned on the cassette cools the fluid that is directed out of the outlet.

16. The kit of claim 15, wherein the fan comprises an exhaust fan for air circulation and to drive the flow of the fluid out of the housing.

17. The kit of claim 15, further comprising a power source.

18. The kit of claim 15, further comprising a temperature probe.

19. The kit of claim 15, further comprising a humidity probe.

20. The kit of claim 15, further comprising shelving on which the cassette is disposed within the housing.

* * * * *